United States Patent
Li et al.

(10) Patent No.: US 11,050,517 B2
(45) Date of Patent: *Jun. 29, 2021

(54) TRANSMISSION OF CONTROL CHANNEL AND DATA CHANNELS FOR COVERAGE ENHANCEMENTS

(71) Applicant: Samsung Electronics Co., Ltd., Suwon-si (KR)

(72) Inventors: Ying Li, Richardson, TX (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/661,932

(22) Filed: Oct. 23, 2019

(65) Prior Publication Data

US 2020/0059328 A1 Feb. 20, 2020

Related U.S. Application Data

(63) Continuation of application No. 15/606,886, filed on May 26, 2017, now Pat. No. 10,484,141, which is a
(Continued)

(51) Int. Cl.
*H04W 4/00* (2018.01)
*H04L 1/18* (2006.01)
(Continued)

(52) U.S. Cl.
CPC .......... *H04L 1/1812* (2013.01); *H04L 1/0072* (2013.01); *H04L 1/08* (2013.01);
(Continued)

(58) Field of Classification Search
CPC ....... H04L 1/1812; H04L 1/08; H04L 1/0072; H04L 1/1858; H04L 1/189; H04L 1/1845;
(Continued)

(56) References Cited

U.S. PATENT DOCUMENTS

8,730,973 B2 * 5/2014 Hu .................... H04W 72/1268
370/395.4
10,492,083 B2 * 11/2019 Wong .................... H04W 24/02
(Continued)

OTHER PUBLICATIONS

USPTO Office Action regarding U.S. Appl. No. 16/780,779, dated Mar. 9, 2021, 19 pages.
(Continued)

*Primary Examiner* — Chuong T Ho

(57) ABSTRACT

Methods and apparatus are provided for a base station to transmit and for a User Equipment (UE) to receive repetitions of an enhanced physical downlink control channel (EPDCCH). Time and frequency resources for EPDCCH repetitions are defined together with restrictions in time resources to provide UE power savings. Time and frequency resources are also defined for repetitions of a physical downlink shared channel (PDSCH) transmission and for repetitions of a physical uplink shared channel (PUSCH) transmission. Methods and apparatus are also provided for the UE to transmit and for the base station to receive acknowledgement information in repetitions of a physical uplink shared channel (PUCCH).

20 Claims, 18 Drawing Sheets

Related U.S. Application Data continuation of application No. 14/538,535, filed on Nov. 11, 2014, now Pat. No. 9,667,386.

(60) Provisional application No. 61/916,663, filed on Dec. 16, 2013, provisional application No. 61/903,777, filed on Nov. 13, 2013.

(51) Int. Cl.
*H04L 1/00* (2006.01)
*H04W 52/02* (2009.01)
*H04L 1/08* (2006.01)

(52) U.S. Cl.
CPC .......... *H04L 1/189* (2013.01); *H04L 1/1858* (2013.01); *H04W 52/0212* (2013.01); *H04L 1/1845* (2013.01); *Y02D 30/70* (2020.08)

(58) Field of Classification Search
CPC ............ H04W 52/0212; Y02D 70/24; Y02D 70/1262; Y02D 70/25; Y02D 70/146; Y02D 70/21; Y02D 70/142; Y02D 70/00
USPC ................................ 370/280, 281, 329, 330
See application file for complete search history.

(56) References Cited

U.S. PATENT DOCUMENTS

| | | | |
|---|---|---|---|
| 2010/0120442 A1* | 5/2010 | Zhuang | H04B 7/15507 455/450 |
| 2011/0038277 A1* | 2/2011 | Hu | H04L 1/0027 370/252 |
| 2012/0252474 A1* | 10/2012 | Tiirola | H04L 5/0053 455/450 |
| 2013/0301491 A1* | 11/2013 | Bashar | H04L 5/0035 370/280 |
| 2014/0233470 A1 | 8/2014 | Kim et al. | |
| 2015/0092690 A1* | 4/2015 | Seo | H04L 5/0053 370/329 |
| 2015/0131579 A1* | 5/2015 | Li | H04L 1/1812 370/329 |
| 2015/0304017 A1* | 10/2015 | Zhuang | H04B 7/15542 370/315 |
| 2016/0021581 A1* | 1/2016 | Deenoo | H04W 36/0055 370/331 |
| 2016/0044615 A1* | 2/2016 | Bashar | H04W 72/0413 370/280 |
| 2016/0234700 A1* | 8/2016 | Wong | H04L 5/0053 |

OTHER PUBLICATIONS

European Patent Office, Communication pursuant to Article 94(3) EPC regarding Application No. 14861321.9, dated Dec. 17, 2020, 6 pages.

\* cited by examiner

TRANSMISSION OF CONTROL CHANNEL AND DATA CHANNELS FOR COVERAGE ENHANCEMENTS

CROSS-REFERENCE TO RELATED APPLICATION AND CLAIM OF PRIORITY

This application is a continuation of U.S. patent application Ser. No. 15/606,886, filed May 26, 2017, which is a continuation of U.S. patent application Ser. No. 14/538,535 filed Nov. 11, 2014, now U.S. Pat. No. 9,667,386, which claims priority under 35 U.S.C. § 119(e) to: U.S. Provisional Patent Application No. 61/903,777 filed Nov. 13, 2013, and U.S. Provisional Patent Application No. 61/916,663 filed Dec. 16, 2013. The contents of the above-identified patent documents are incorporated herein by reference.

TECHNICAL FIELD

The present application relates generally to wireless communications and, more specifically, to control and data signaling for coverage enhancements.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

This disclosure provides methods and apparatus for control and data signaling to support communication with coverage enhancements.

In a first embodiment, a method includes mapping, by a base station, a first repetition for a transmission of an enhanced physical downlink control channel (EPDCCH) in a sub-frame (SF) with index $n_s$. The SF is located in a frame that includes ten SFs and has system frame number (SFN) Z, and is determined as $((Z-Z_0) \cdot D + n_s - n_{s0}) \bmod (N_{EPDCCH} + Gap_{EPDCCH}) = 0$, where $Z_0$ is a SFN offset with $0 \le Z_0 < 1024$, $n_{s0}$ is a SF offset with $0 \le n_{s0} < 10$, D is a number of SFs within a frame where the base station transmits an EPDCCH repetition with $0 < D \le 10$, $N_{EPDCCH}$ is a number of SFs with repetitions of the EPDCCH transmission, and $Gap_{EPDCCH}$ is an offset. The method additionally includes transmitting, by the base station to a User Equipment (UE), the repetitions of the EPDCCH in $N_{EPDCCH}$ SFs.

In a second embodiment, a method includes mapping, by a base station, a first repetition for a transmission of an enhanced physical downlink control channel (EPDCCH) conveying a downlink control information (DCI) format in a first sub-frame (SF), a first set of frequency resources, and a first set of enhanced control channel elements (ECCEs) and a second repetition in a second SF, a second set of frequency resources, and a second set of ECCEs. The first set of ECCEs and the second set of ECCEs include a same number of ECCEs and the first frequency resources are different than the second frequency resources. The method additionally includes transmitting, by the base station to a User Equipment (UE), the first EPDCCH repetition and the second EPDCCH repetition.

In a third embodiment, a method includes mapping, by a User Equipment (UE), a first repetition of a physical uplink control channel (PUCCH) transmission in a first PUCCH resource in a first sub-frame (SF) and a second repetition of the PUCCH transmission in a second PUCCH resource in a second SF. The PUCCH transmission conveys hybrid automatic repeat request acknowledgement (HARQ-ACK) information in response to a reception by the UE of a data transport block in a physical downlink shared channel (PDSCH) scheduled by a downlink control information (DCI) format transmitted in an enhanced physical control channel (EPDCCH) that consists of enhanced control channel elements (ECCEs). If the UE is of a first type, the UE determines the first PUCCH resource from an ECCE with a lowest index among the ECCEs of the EPDCCH and the second resource is configured to the UE from the base station by radio resource signaling. If the UE is of a second type, the UE determines the first PUCCH resource to be same as the second PUCCH resource as configured to the UE from the base station by radio resource signaling. The method additionally includes transmitting, by the UE to the base station, the first repetition of the PUCCH transmission and the second repetition of the PUCCH transmission.

In a fourth embodiment, a base station includes a mapper and a transmitter. The mapper is configured to map a first repetition for a transmission of an enhanced physical downlink control channel (EPDCCH) in a sub-frame (SF) with index $n_s$, wherein the SF is located in a frame that includes ten SFs and has system frame number (SFN) Z, and is determined as $((Z-Z_0) \cdot D + n_s - n_{s0}) \bmod (N_{EPDCCH} + Gap_{EPDCCH}) = 0$, where $Z_0$ is a SFN offset with $0 \le Z_0 < 1024$, $n_{s0}$ is a SF offset with $0 \le n_{s0} < 10$, D is a number of SFs within a frame where the base station transmits an EPDCCH repetition with $0 < D \le 10$, $N_{EPDCCH}$ is a number of SFs with repetitions of the EPDCCH transmission, and $Gap_{EPDCCH}$ is an offset. The transmitter is configured to transmit the repetitions of the EPDCCH in $N_{EPDCCH}$ SFs.

In a fifth embodiment, a User Equipment (UE) includes a receiver and a mapper. The receiver is configured to receive up to $N_{EPDCCH}$ repetitions in respective sub-frames (SFs) for a transmission of an enhanced physical control channel (EPDCCH). The mapper is configured to map the first repetition of the EPDCCH in a SF with index $n_s$, wherein the SF is located in a frame that includes ten SFs and has system frame number (SFN) Z, and is determined as $((Z-Z_0) \cdot D + n_s - n_{s0}) \bmod (N_{EPDCCH} + Gap_{EPDCCH}) = 0$, where $Z_0$ is a SFN offset with $0 \le Z_0 < 1024$, $n_{s0}$ is a SF offset with $0 \le n_{s0} < 10$, D is a number of SFs within a frame where the base station transmits an EPDCCH repetition with $0 < D \le 10$, and $Gap_{EPDCCH}$ is an offset.

In a sixth embodiment, a base station includes a mapper and a transmitter. The mapper is configured to map a first repetition for a transmission of an enhanced physical downlink control channel (EPDCCH) in a first sub-frame (SF), a first set of frequency resources, and a first set of enhanced control channel elements (ECCEs) and a second repetition in a second SF, a second set of frequency resources, and a second set of ECCEs, wherein the first set of ECCEs and the second set of ECCEs include a same number of ECCEs and the first frequency resources are different than the second frequency resources. The transmitter is configured to transmit the first EPDCCH repetition and the second EPDCCH repetition.

In a seventh embodiment, a User Equipment (UE) includes a receiver and a mapper. The receiver is configured to receive a first repetition and a second repetition of an enhanced physical downlink control channel (EPDCCH) transmission. The mapper is configured to map the first repetition in a first sub-frame (SF), a first set of frequency resources, and a first set of enhanced control channel elements (ECCEs) and the second repetition in a second SF, a second set of frequency resources, and a second set of ECCEs, wherein the first set of ECCEs and the second set of ECCEs include a same number of ECCEs and the first frequency resources are different than the second frequency resources.

In an eighth embodiment, a User Equipment (UE) includes a mapper and a transmitter. The mapper is configured to map a first repetition of a physical uplink control channel (PUCCH) transmission in a first PUCCH resource in a first sub-frame (SF) and a second repetition of the PUCCH transmission in a second PUCCH resource in a second SF. The PUCCH transmission conveys hybrid automatic repeat request acknowledgement (HARQ-ACK) information in response to a reception by the UE of a data transport block in a physical downlink shared channel (PDSCH) scheduled by a downlink control information (DCI) format transmitted in an enhanced physical control channel (EPDCCH) that consists of enhanced control channel elements (ECCEs). If the UE is of a first type, the UE determines the first PUCCH resource from an ECCE with a lowest index among the ECCEs of the EPDCCH and the second resource is configured to the UE from the base station by radio resource signaling. If the UE is of a second type, the UE determines the first PUCCH resource to be same as the second PUCCH resource as configured to the UE from the base station by radio resource signaling. The transmitter is configured to transmit the first repetition of the PUCCH transmission and the second repetition of the PUCCH transmission.

In a ninth embodiment, a base station includes a receiver and a mapper. The receiver is configured to receive a first repetition of a physical uplink control channel (PUCCH) transmission and a second repetition of the PUCCH transmission. The mapper is configured to map to map the first repetition of the PUCCH transmission in a first PUCCH resource in a first sub-frame (SF) and a second repetition of the PUCCH transmission in a second PUCCH resource in a second SF. The PUCCH transmission conveys hybrid automatic repeat request acknowledgement (HARQ-ACK) information in response to a transmission by the base station of a data transport block in a physical downlink shared channel (PDSCH) scheduled by a downlink control information (DCI) format transmitted by the base station in an enhanced physical control channel (EPDCCH) that consists of enhanced control channel elements (ECCEs). If the PUCCH transmission is from a User Equipment (UE) is of a first type, the base station determines the first PUCCH resource from an ECCE with a lowest index among the ECCEs of the EPDCCH and the second resource is configured from the base station. If the PUCCH transmission is from a UE of a second type, the base station determines the first PUCCH resource to be same as the second PUCCH resource and configured from the base station.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many if not most instances such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 28, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: 3GPP TS 36.211 v11.2.0, "E-UTRA, Physical channels and modulation" (REF 1); 3GPP TS 36.212 v11.2.0, "E-UTRA, Multiplexing and Channel coding" (REF 2); 3GPP TS 36.213 v11.2.0, "E-UTRA, Physical Layer Procedures" (REF 3); 3GPP TS 36.321 v11.2.0, "E-UTRA, Medium Access Control (MAC) protocol specification" (REF 4); 3GPP TS 36.331 v11.2.0, "E-UTRA, Radio Resource Control (RRC) Protocol Specification" (REF 5), and 3GPP TS 36.304 v11.2.0, "User Equipment (UE) procedures in idle mode".

Embodiments of the present disclosure relate to control and data signaling to support communication with coverage enhancements. A wireless communication network includes a DownLink (DL) that conveys signals from transmission points, such as base stations or enhanced NodeBs (eNBs), to UEs. The wireless communication network also includes an UpLink (UL) that conveys signals from UEs to reception points, such as eNBs.

Figure 1:
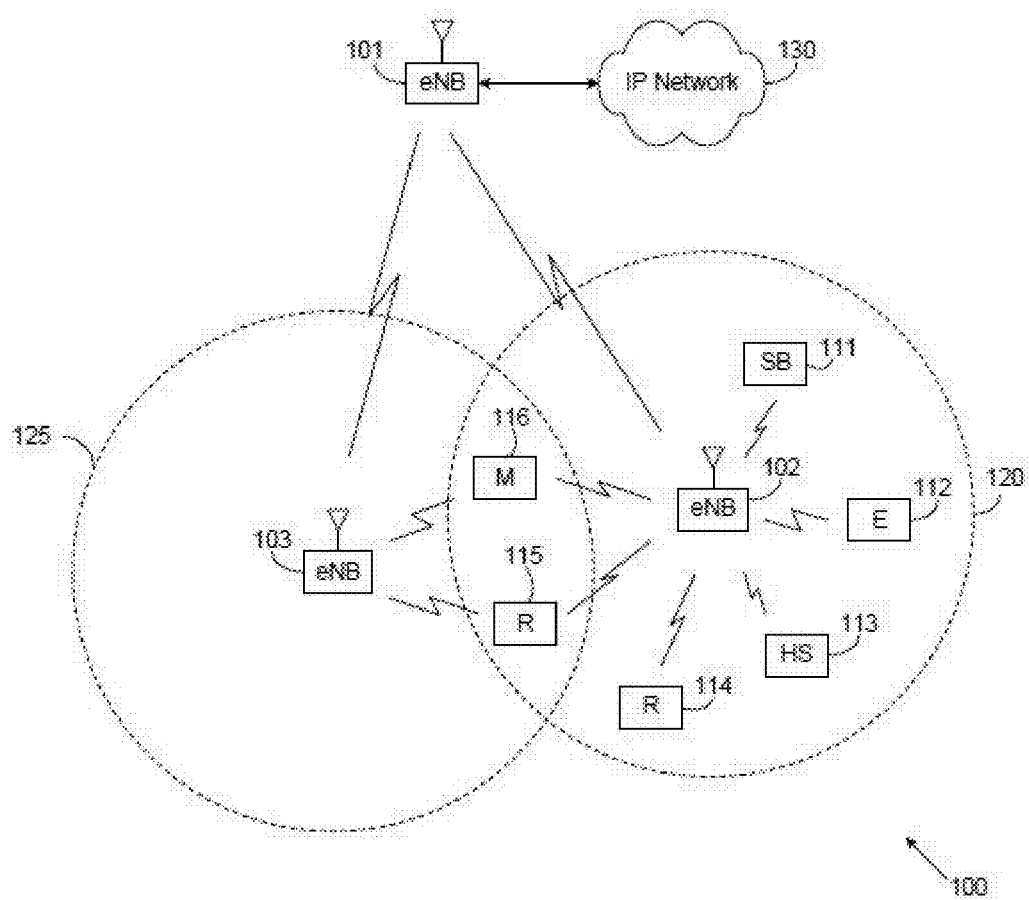
FIG. 1 illustrates an example wireless communication network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." A UE, may be fixed or mobile and may be a cellular phone, a personal computer device, and the like. For the sake of convenience, the terms "user equipment" and "UE" are used in this patent document to refer to remote wireless equipment that wirelessly accesses an eNB, whether the UE is a mobile device (such as a mobile telephone or smart-phone) or is normally considered a stationary device (such as a desktop computer or vending machine).

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, various components of the network 100 (such as the eNBs 101-103 and/or the UEs 111-116) support the adaptation of communication direction in the network 100, and can provide coverage enhancements for control or data signaling.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
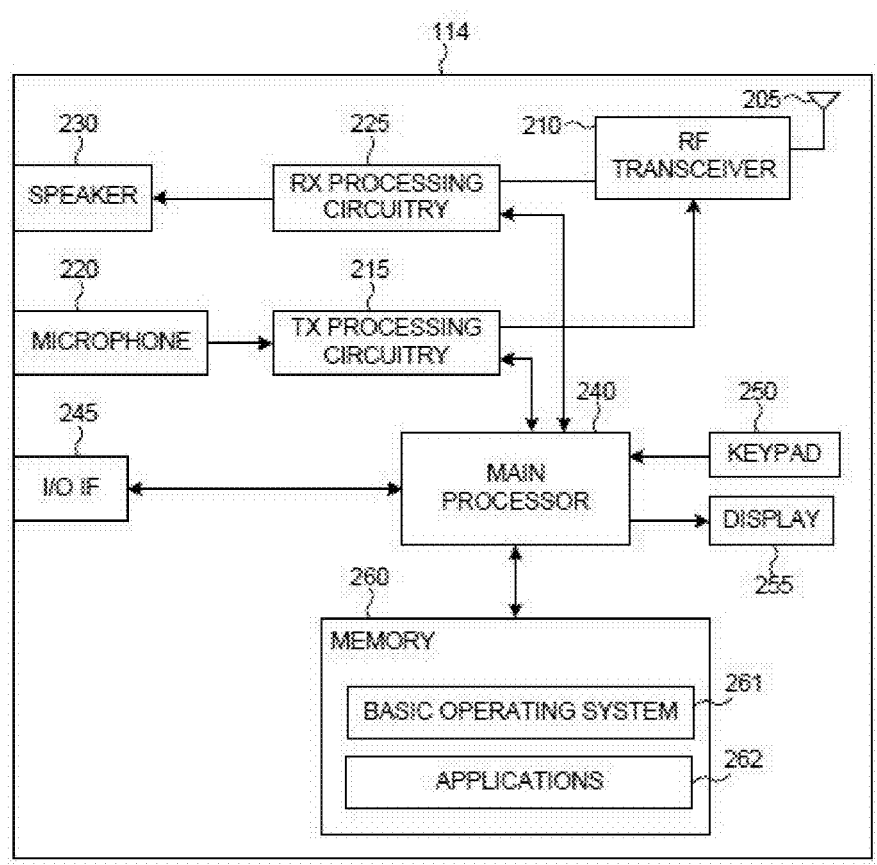
FIG. 2 illustrates an example user equipment (UE) according to this disclosure.

FIG. 2 illustrates an example UE 114 according to this disclosure. The embodiment of the UE 114 shown in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 114 includes an antenna 205, a radio frequency (RF) transceiver 210, transmit (TX) processing circuitry 215, a microphone 220, and receive (RX) processing circuitry 225. The UE 114 also includes a speaker 230, a main processor 240, an input/output (I/O) interface (IF) 245, a keypad 250, a display 255, and a memory 260. The memory 260 includes a basic operating system (OS) program 261 and one or more applications 262.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the main processor 240 for further processing (such as for web browsing data).

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The main processor 240 can include one or more processors or other processing devices and can execute the basic OS program 261 stored in the memory 260 in order to control the overall operation of the UE 114. For example, the main processor 240 could control the reception of forward channel signals and the transmission of reverse channel signals by the RF transceiver 210, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260. The main processor 240 can move data into or out of the memory 260 as required by an executing process. In some embodiments, the main processor 240 is configured to execute the applications 262 based on the OS program 261 or in response to signals received from eNBs, other UEs, or an operator. The main processor 240 is also coupled to the I/O interface 245, which provides the UE 114 with the ability to connect to other devices such as laptop computers and handheld computers. The I/O interface 245 is the communication path between these accessories and the main processor 240.

The main processor 240 is also coupled to the keypad 250 and the display unit 255. The operator of the UE 114 can use the keypad 250 to enter data into the UE 114. The display 255 may be a liquid crystal display or other display capable of rendering text and/or at least limited graphics, such as from web sites. The display 255 could also represent a touch-screen.

The memory 260 is coupled to the main processor 240. Part of the memory 260 could include a control or data signaling memory (RAM), and another part of the memory 260 could include a Flash memory or other read-only memory (ROM).

As described in more detail below, the transmit and receive paths of the UE 114 (implemented using the RF transceiver 210, TX processing circuitry 215, and/or RX processing circuitry 225) support control or data signaling in a normal mode or in an enhanced coverage mode.

Although FIG. 2 illustrates one example of UE 114, various changes may be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the UE 114 configured as a mobile telephone or smart-phone, UEs could be configured to operate as other types of mobile or stationary devices. In addition, various components in FIG. 2 could be replicated, such as when different RF components are used to communicate with the eNBs 101-103 and with other UEs.

Figure 3:
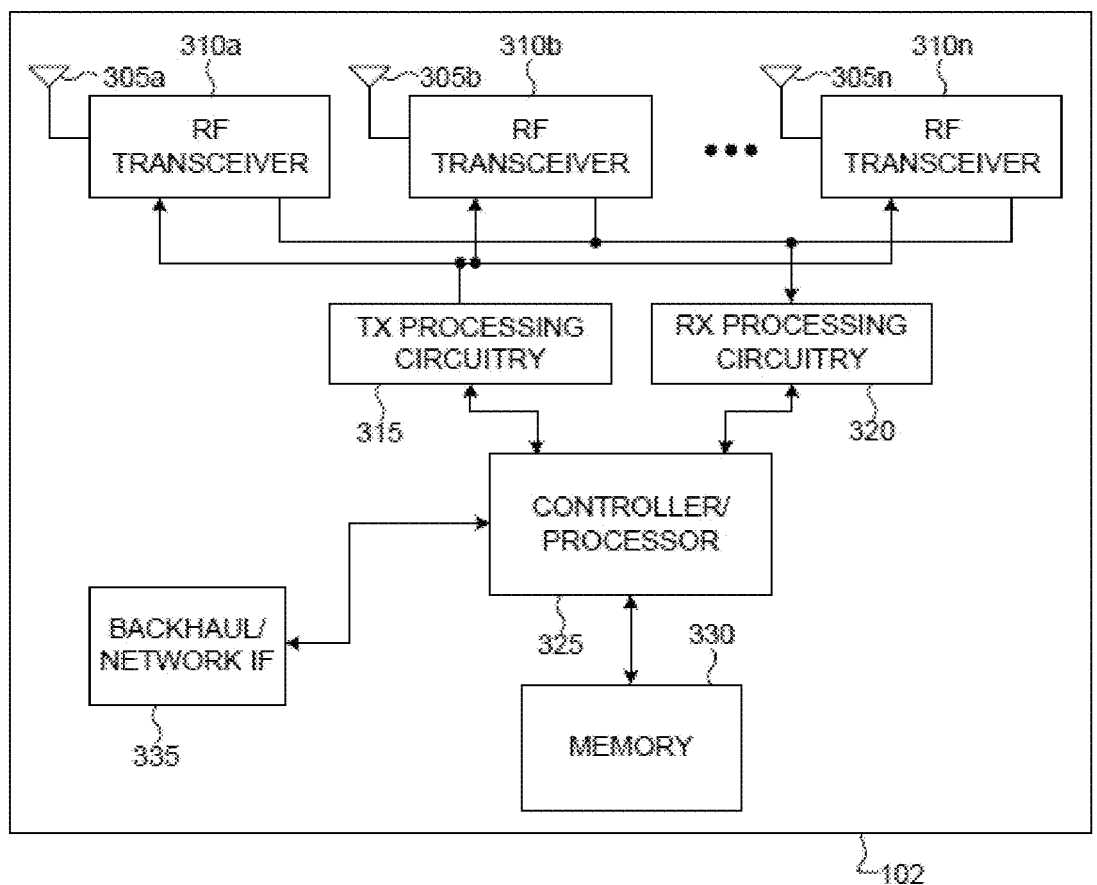
FIG. 3 illustrates an example enhanced NodeB (eNB) according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as a basic OS. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the eNB 102 (implemented using the RF transceivers 310a-310n, TX processing circuitry 315, and/or RX processing circuitry 320) support control or data signaling in a normal mode or in an enhanced coverage mode.

Although FIG. 3 illustrates one example of an eNB 102, various changes may be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver).

In some wireless networks, DL signals include data signals conveying information content, control signals conveying DL Control Information (DCI), and Reference Signals (RS), which are also known as pilot signals. DL signals can be transmitted using Orthogonal Frequency Division Multiplexing (OFDM). An eNB, such as eNB 102, can transmit data information through Physical DL Shared CHannels (PDSCHs). The eNB 102 can transmit DCI through Physical DL Control CHannels (PDCCHs) or through Enhanced PDCCHs (EPDCCHs)—see also REF 1. In the following, in order to refer to either PDCCH or EPDCCH, the term (E)PDCCH is used. The eNB, such as eNB 102, can transmit one or more of multiple types of RS, including a UE-Common RS (CRS), a Channel State Information RS (CSI-RS), and a DeModulation RS (DMRS)— see also REF 1. A CRS can be transmitted over a DL system BandWidth (BW) and can be used by UEs, such as UE 114, to demodulate data or control signals or to perform measurements. To reduce CRS overhead, eNB 102 can transmit a CSI-RS with a smaller density in the time or frequency domain than a CRS. For Interference Measurements (IMs), CSI-IM resources associated with a Zero Power CSI-RS (ZP CSI-RS) can be used. The UE 114 can determine CSI-RS transmission parameters through higher-layer signaling, such as Radio Resource Control (RRC) signaling (see also REF 5) from an eNB, such as eNB 102. DMRS is transmitted only in the BW of a respective PDSCH or EPDCCH, and the UE 114 can use the DMRS to demodulate information in a PDSCH or EPDCCH. A PDSCH or EPDCCH transmission can be in a DL Sub-Frame (SF). A SF is part of a frame that includes ten SFs. A frame is identified by a System Frame Number ranging from 0 to 1023 (and can be represented by 10 binary elements). A SF includes two slots.

Figure 4:
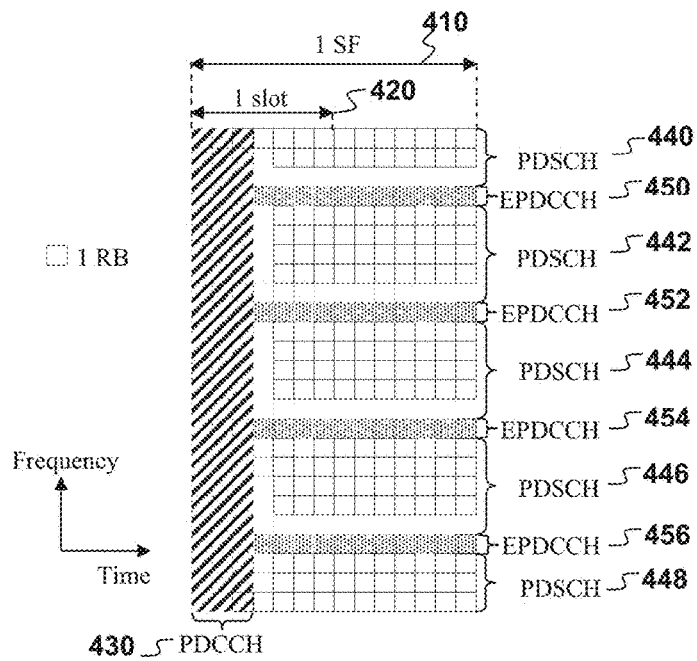
FIG. 4 illustrates an example structure for a DL SF according to this disclosure.

FIG. 4 illustrates an example structure for a DL SF according to this disclosure. The embodiment of the DL SF structure shown in FIG. 4 is for illustration only. Other embodiments could be used without departing from the scope of the present disclosure.

A DL SF 410 includes two slots 420 and a total of $N_{symb}^{DL}$ symbols for transmitting of data information and DCI. The first $M_{symb}^{DL}$ SF symbols are used to transmit PDCCHs and other control channels (not shown) 430. The remaining $N_{symb}^{DL} - M_{symb}^{DL}$ SF symbols are primarily used to transmit PDSCHs 440, 442, 444, 446, and 448 or EPDCCHs 450, 452, 454, and 456. A transmission BW consists of frequency resource units referred to as Resource Blocks (RBs). Each RB consists of $N_{sc}^{RB}$ sub-carriers, or Resource Elements (REs). A UE can be allocated $M_{PDSCH}$ RBs for a total of $M_{sc}^{PDSCH} = M_{PDSCH} \cdot N_{sc}^{RB}$ REs for the PDSCH transmission BW. An EPDCCH transmission can be in one RB or in multiple of RBs.

UL signals also include data signals conveying information content, control signals conveying UL Control Information (UCI), and RS. UE 114 transmits data information or UCI through a respective Physical UL Shared CHannel (PUSCH) or a Physical UL Control CHannel (PUCCH). If UE 114, simultaneously transmits data information and UCI, UE 114 can multiplex both in a PUSCH. UCI includes Hybrid Automatic Repeat reQuest ACKnowledgement (HARQ-ACK) information, indicating correct or incorrect detection of data Transport Blocks (TBs) in a PDSCH, Scheduling Request (SR) indicating whether a UE has data in its buffer, and Channel State Information (CSI) enabling eNB 102 to select appropriate parameters for PDSCH transmissions to the UE. HARQ-ACK information includes a positive ACKnowledgement (ACK) in response to a correct (E)PDCCH or data TB detection, a Negative ACKnowledgement (NACK) in response to an incorrect data TB detection, and an absence of a (E)PDCCH detection (DTX) which can be implicit (that is, a UE does not transmit a HARQ-ACK signal) or explicit if a UE can identify missed (E)PDCCHs by other means (it is also possible to represent NACK and DTX with a same NACK/DTX state). UL RS includes DMRS and Sounding RS (SRS)—see also REF 1. DMRS is transmitted only in a BW of a respective PUSCH or PUCCH and an eNB, such as eNB 102, can use a DMRS to demodulate information in a PUSCH or PUCCH.

DCI can serve several purposes. A DCI format in a respective (E)PDCCH can schedule a PDSCH or a PUSCH transmission conveying data information to or from UE 114, respectively. UE 114 always monitors a DCI format 1A for PDSCH scheduling and a DCI format 0 for PUSCH scheduling. These two DCI formats are designed to always have a same size and are jointly referred to as DCI Format 0/1A. Another DCI format, DCI format 1C, in a respective (E)PDCCH can schedule a PDSCH providing System Information (SI) to a group of UEs for network configuration parameters, or a response to a Random Access (RA) by UEs, or paging information to a group of UEs, and so on. Another DCI format, DCI format 3 or DCI format 3A (jointly referred to as DCI format 3/3A) can provide to a group of UEs Transmission Power Control (TPC) commands for transmissions of respective PUSCHs or PUCCHs.

A DCI format includes Cyclic Redundancy Check (CRC) bits in order for UE 114 to confirm a correct detection. A DCI format type is identified by a Radio Network Temporary Identifier (RNTI) that scrambles the CRC bits. For a DCI format scheduling a PDSCH or a PUSCH to a single UE (unicast scheduling), the RNTI is a Cell RNTI (C-RNTI). For a DCI format scheduling a PDSCH conveying SI to a group of UEs (broadcast scheduling), the RNTI is a SI-RNTI. For a DCI format scheduling a PDSCH providing a response to a RA from a group of UEs, the RNTI is a RA-RNTI. For a DCI format scheduling a PDSCH paging a group of UEs, the RNTI is a P-RNTI. For a DCI format providing TPC commands to a group of UEs, the RNTI is a TPC-RNTI. Each RNTI type is configured to a UE through higher layer signaling (and the C-RNTI is unique for each UE).

Figure 5:
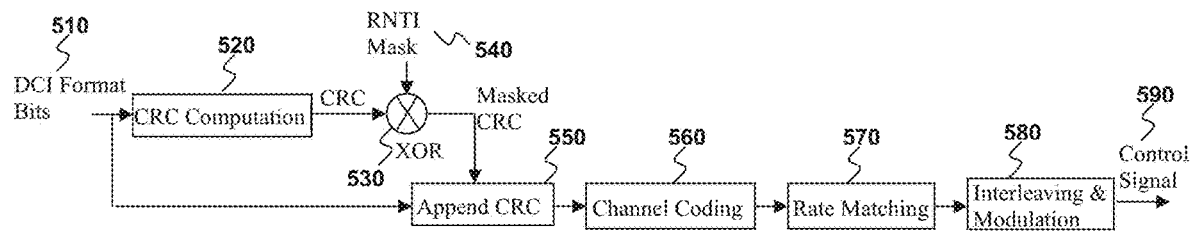
FIG. 5 illustrates an example encoding process for a DCI format according to this disclosure.

FIG. 5 illustrates an example encoding process for a DCI format according to this disclosure. The embodiment of the encoding process shown in FIG. 5 is for illustration only. Other embodiments could be used without departing from the scope of the present disclosure.

The eNB 102 separately codes and transmits each DCI format in a respective (E)PDCCH. A RNTI for UE 114, for which a DCI format is intended for, masks a CRC of a DCI format codeword in order to enable the UE to identify that a particular DCI format is intended for the UE. The CRC of (non-coded) DCI format bits 510 is computed using a CRC computation operation 520, and the CRC is then masked using an exclusive OR (XOR) operation 530 between CRC and RNTI bits 240. The XOR operation 530 is defined as: XOR(0,0)=0, XOR(0,1)=1, XOR(1,0)=1, XOR(1,1)=0. The masked CRC bits are appended to DCI format information bits using a CRC append operation 550, channel coding is performed using a channel coding operation 560 (such as an operation using a convolutional code), followed by rate matching operation 570 applied to allocated resources, and finally, an interleaving and a modulation 580 operation are performed, and the output control signal 590 is transmitted. In the present example, both a CRC and a RNTI include 16 bits.

Figure 6:
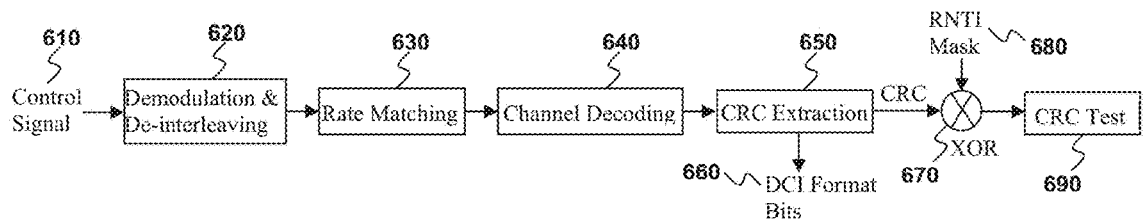
FIG. 6 illustrates an example decoding process for a DCI format according to this disclosure.

FIG. 6 illustrates an example decoding process for a DCI format according to this disclosure. The embodiment of the decoding process shown in FIG. 6 is for illustration only. Other embodiments could be used without departing from the scope of the present disclosure.

A received control signal 610 is demodulated and the resulting bits are de-interleaved at operation 620, a rate matching applied at the eNB 102 transmitter is restored through operation 630, and data is subsequently decoded at operation 640. After decoding the data, DCI format information bits 660 are obtained after extracting CRC bits 650, which are then de-masked 670 by applying the XOR operation with a UE RNTI 680. Finally, UE 114 performs a CRC test 690. If the CRC test passes and the contents of the DCI format are valid, the UE 114 determines that a DCI format corresponding to the received control signal 610 is valid and determines parameters for signal reception or signal transmission; otherwise, the UE 114 disregards the presumed DCI format.

The eNB 102 separately codes and transmits a DCI format in a respective (E)PDCCH. To avoid an (E)PDCCH transmission to UE 114 blocking an (E)PDCCH transmission to another UE, such as UE 115, a location of each (E)PDCCH transmission in the time-frequency domain of a DL control region is not unique and, as a consequence, UE 114 needs to perform multiple decoding operations to determine whether there is a (E)PDCCH intended for it. REs carrying a PDCCH or an EPDCCH are grouped into Control Channel Elements (CCEs) or ECCEs, respectively, in the logical domain (will be jointly referred to as (E)CCEs). For a given number of DCI format bits, a number of (E)CCEs for a respective (E)PDCCH depends on a channel coding rate (Quadrature Phase Shift Keying (QPSK) is assumed as the modulation scheme) required to achieve a desired (E)PDCCH detection reliability such as a desired BLock Error Rate (BLER). The eNB 102 can use a lower channel coding rate (more (E)CCEs) for (E)PDCCH transmissions to UEs experiencing low DL Signal-to-Interference and Noise Ratio (SINR) than to UEs experiencing a high DL SINR. (E)CCE aggregation levels can consist, for example, of 1, 2, 4, and 8 CCEs or 1, 2, 4, 8, 16, and possibly 32 ECCEs.

For an (E)PDCCH decoding process, UE 114 can determine a search space for candidate (E)PDCCH transmissions in a DL control region of a serving cell after it restores (E)CCEs in the logical domain according to a UE-common set of CCEs (Common Search Space or CSS) and according to a UE-dedicated set of CCEs (UE-Dedicated Search Space or UE-DSS) —see also REF 3. A CSS can be used to transmit (E)PDCCHs for DCI formats associated with UE-common control information and use a SI-RNTI, a P-RNTI, a TPC-RNTI, and so on, to scramble the respective CRCs. A UE-DSS can used to transmit (E)PDCCHs for DCI formats associated with UE-specific control information and use respective C-RNTIs to scramble respective CRCs. (E)PDCCHs conveying DCI Formats 0/1A can be transmitted in both the CSS and the UE-DSS.

The DL control region in FIG. 4 is assumed to occupy a maximum of $M_{symb}^{DL}=3$ SF symbols and a PDCCH is transmitted substantially over an entire DL BW. This configuration limits PDCCH capacity of a DL control region. Expanded capacity for DL control signaling is needed in several cases including support of UEs requiring coverage enhancements. For such a UE, an aggregation level of L=8 CCEs is not sufficient to provide a desired BLER as a respective SINR can be very low. Using an aggregation level larger than L=8 CCEs, such as L=16 CCEs can be possible for larger DL BWs but cannot provide on its own a sufficient coverage enhancement as the SINR is improved by at most 3 dB. For this reason, EPDCCH is more appropriate to support coverage enhancements. In the following, the use of EPDCCH is assumed unless explicitly noted otherwise.

A DL SF can be a normal one or it can be configured as Multicast-Broadcast Single Frequency Network (MBSFN) SF. A normal DL SF includes a conventional control region of $M_{symb}^{DL}$ SF symbols as in FIG. 4 while an MBSFN SF includes a conventional control region followed by an MBSFN region having contents that depend on a usage type for the MBSFN SF (see also REF 1). Information about a set of SFs configured as MBSFN SFs in a cell is provided as part of system information. In principle, an arbitrary pattern of MBSFN SFs can be configured with a pattern repeating every 40 msec. However, as information necessary to operate a network (specifically, synchronization signals, system information, information for network access, and paging) needs to be transmitted, SFs where such information is provided cannot be configured as MBSFN SFs. Therefore, SFs 0, 4, 5, and 9 for FDD and SFs 0, 1, 5, and 6 for TDD cannot be configured as MBSFN SFs.

In Time Domain Multiplexing (TDM) for Inter-Cell Interference Coordination (ICIC), other than regular SFs, another type of SF, referred to as Almost Blank SF (ABS), can be used in order to mitigate inter-cell interference. In ABS, a cell assumes that an interfering cell does not transmit signaling in all SF symbols other than the first symbol. Compared to a regular SF, a transmission power from an interfering cell in an ABS can be considerably reduced. A subset of MBSFN SFs can be used as ABS.

Figure 7:
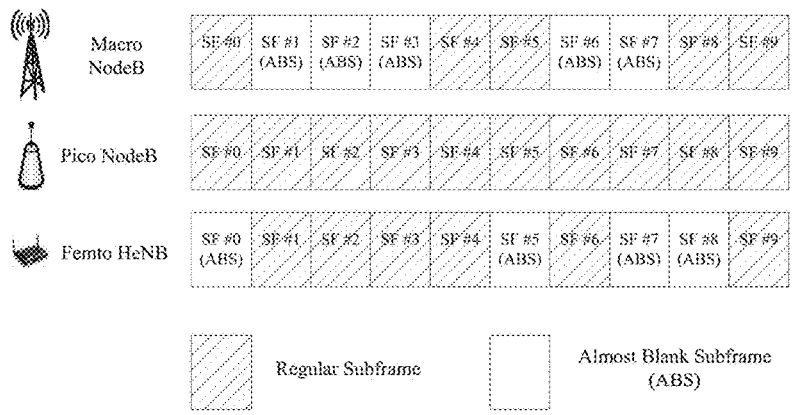
FIG. 7 illustrates an example of TDM-ICIC in a scenario with co-channel deployment of a macro-cell, a pico-cell, and a femto-cell Home eNB (HeNB) according to this disclosure.

FIG. 7 illustrates an example of TDM-ICIC in a scenario with co-channel deployment of a macro-cell, a pico-cell, and a femto-cell Home eNB (HeNB) according to this disclosure. The embodiment of the TDM-ICIC shown in FIG. 7 is for illustration only. Other embodiments could be used without departing from the scope of the present disclosure.

In the example shown in FIG. 7, in a frame (10 ms) that includes ten SFs (SFs #0-9), SFs #1, 2, 3, 6, 7 are ABSs for the macro eNB, and SFs #0, 5, 8 are ABSs for the femto HeNB. This provides the opportunity for the pico eNB to serve its UEs with reduced interference during ABS in interfering eNB thereby improving reception performance at the UEs.

In order to obtain performance benefits from TDM-ICIC, an eNB 102 scheduler needs to be aware of ABS patterns used by interfering eNBs in order to accordingly perform link adaptation for its transmissions. In FDD, an ABS pattern is periodic with a period that is an integer multiple of 40 SFs. In TDD, an ABS pattern period depends on a respective TDD UL-DL configuration. ABS patterns are configured and signaled between eNBs over an X2 interface or via a HeNB gateway if an X2 interface is not available. Since a period of an ABS pattern is an integer multiple of 40 ms, X2 signaling uses a bit-map of a same length as the ABS pattern (see also REF 5).

UE 114 can be configured with discontinuous reception (DRX), (see also REF 5) where the UE 114 applies an on-duration on wake-up from DRX. On-duration is a duration in DL SFs that a UE waits for, after waking up from DRX, to receive EPDCCHs. If UE 114 detects an EPDCCH, the UE 114 stays awake and starts an inactivity timer. An inactivity-timer is a duration in DL SFs the UE waits to detect an EPDCCH, from a last EPDCCH detection, failing which it re-enters DRX. The UE 114 restarts an inactivity timer following a single detection of an EPDCCH for a first transmission only. An active time in DRX is a total duration that the UE 114 is awake. This includes the 'on-duration' of a DRX cycle, a time the UE 114 is performing continuous reception while an inactivity timer has not expired and a time the UE 114 is performing continuous reception while waiting for a DL retransmission. The eNB 102 can signal an on-duration and an inactivity-timer duration to the UE 114. The eNB 102 can also signal a DRX cycle. For example (see also REF 5), denoting for a frame with System Frame Number (SFN), if longDRX-Cycle is used, the UE 114 wakes up at [SFN*10+SF number] mod (longDRX-Cycle) =drxStartOffset, and starts an onDurationTimer; if the UE 114 detects an EPDCCH indicating a new transmission, within Active Time which is a total duration the UE 114 is awake including on-duration, the time UE 114 performs reception while inactivity timer has not expired, the UE 114 starts or restarts drx-InactivityTimer. Here, drxStartOffset (0 . . . longDRX-Cycle) is in the unit of SF, onDurationTimer is in the unit of EPDCCH SFs, drx-InactivityTimer is in the unit of EPDCCH SFs. In the following, EPDCCH SF refers to a DL SF where UE 114 can receive EPDCCH.

Figure 8:
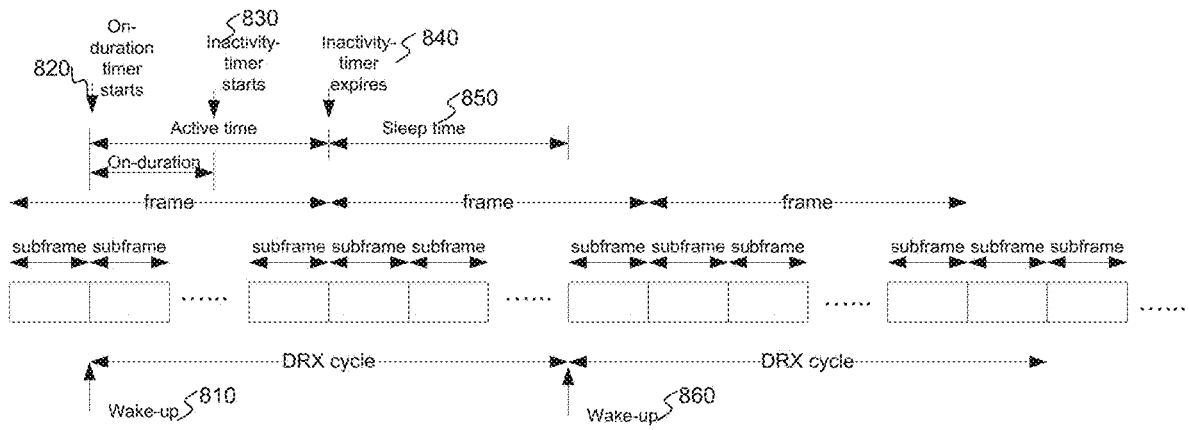
FIG. 8 illustrates an example of a DRX mode with on-duration and inactivity timer according to this disclosure.

FIG. 8 illustrates an example of a DRX mode with on-duration and inactivity timer according to this disclosure. The embodiment of the DRX mode with on-duration and inactivity timer shown in FIG. 8 is for illustration only. Other embodiments could be used without departing from the scope of the present disclosure.

UE 114 wakes up at a wake-up time ($t_0$) 810 and starts onDurationTimer at a first time ($t_1$) 820. UE 114 detects an EPDCCH and starts InactivityTimer at a second time ($t_2$) 830. UE 114 continues monitoring EPDCCH, but UE 114 does not detect any when InactivityTimer expires at a third time ($t_3$) 840; therefore, UE 114 goes to sleep. The sleep time 850 may last until next wakeup time at second wakeup time ($t_4$) 860 if there is no non-scheduled wakeup.

In a DRX mode, or when DRX is configured for UE 114, the UE 114 can have scheduled wakeup (for example, at regular wakeup times in the DRX mode). The UE 114 also can have non-scheduled wakeup (for example, within a DRX cycle), due to some reasons such as having emergency message, HARQ operation, and so on).

UE 114 can be paged by eNB 102 (see also REF 6). The UE 114 monitors one Paging Occasion (PO) per DRX cycle, where one PO is one SF. A Paging Frame (PF) can have one or multiple POs. The UE 114 determines when to monitor a PO based on predetermined mapping function that maps the ID of the UE ID, the paging cycle, and the like, to the timing of a PO that can carry paging for the UE 114. If the UE 114 detects an EPDCCH with P-RNTI, the UE 114 monitors a Paging CHannel (PCH) for a paging message. A paging message can include one or multiple IDs of UEs. Different paging messages can include IDs for different groups of UEs.

In a TDD communication system, the communication direction in some SFs of a frame is in the DL, and the communication direction in some other SFs is in the UL. Table 1 lists indicative UL-DL configurations over a frame period (10 SFs). "D" denotes a DL SF, "U" denotes an UL SF, and "S" denotes a special SF that includes a DL transmission field referred to as DwPTS, a Guard Period (GP), and a UL transmission field referred to as UpPTS (see also REF 1). Several combinations exist for the duration of each field in a special SF subject to the condition that the total duration is one SF.

TABLE 1

TDD UL-DL configurations

| TDD UL-DL Configuration | DL-to-UL Switch-point periodicity | SF number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The TDD UL-DL configurations in Table 1 provide 40% and 90% of DL SFs per frame to be DL SFs. Despite this flexibility, a semi-static TDD UL-DL configuration that can be updated every 640 milliseconds or less frequently by signaling of a System Information Block (SIB) or, in case of DL Carrier Aggregation and a secondary cell by RRC signaling, may not match well with short-term data traffic conditions. For this reason, a faster adaptation of a TDD UL-DL configuration can improve system throughput, particularly for a low or moderate number of connected UEs. For example, when there is more DL traffic than UL traffic, the TDD UL-DL configuration can be adapted to include more DL TTIs. Signaling for faster adaptation of a TDD UL-DL configuration can be provided by several mechanisms, including by a DCI format in an EPDCCH, Medium Access Control (MAC) signaling, and RRC signaling.

An operating constraint in an adaptation of a conventional TDD UL-DL configuration by means other than SIB signaling is an existence of UEs that cannot be aware of such adaptation. Such UEs are referred to as conventional UEs. Since conventional UEs perform measurements in DL SFs using a respective CRS, DL SFs cannot be changed to UL SFs or to special SFs by a faster adaptation of a TDD UL-DL configuration. However, an UL SF can be changed to a DL SF without impacting conventional UEs because an eNB, such as eNB 102, can ensure that such UEs do not transmit any signals in such UL SFs. In addition, at least one UL SF common to all adapted TDD UL-DL configurations can exist to enable the eNB to possibly select this UL SF for UEs to transmit PUCCHs. In some implementations, this UL SF is SF #2.

Considering the above, Table 2 indicates the flexible SFs (denoted by 'F') for each TDD UL-DL configuration in Table 1. A SF is referred to as a DL flexible SF if it is an UL SF in a conventional TDD UL-DL configuration and is adapted to a DL SF. A SF is referred to as a UL flexible SF if it is an UL SF in a conventional TDD UL-DL configuration that could be adapted to a DL SF in an adapted TDD UL-DL configuration but it remains an UL SF. A SF is referred to as DL fixed SF if it is a DL SF in a conventional TDD UL-DL configuration. A SF is referred to as UL fixed SF if it is an UL SF in a TDD UL-DL configuration a UE uses to determine UL SFs for transmitting HARQ-ACK information in response to PDSCH receptions (or in response to a release of a semi-persistently scheduled PDSCH). A special SF in a conventional TDD UL-DL configuration can be adapted only to a DL SF. For single-cell operation, a TDD UL-DL configuration can be configured by an eNB to a UE for determining transmission timing for HARQ-ACK information transmitted by the UE in response to PDSCH receptions (or SPS PDSCH release). This is referred to as DL HARQ reference TDD UL-DL configuration. A TDD UL-DL configuration can be configured by an eNB to a UE for determining transmission timing for HARQ-ACK information in response to PUSCH transmissions from the UE to the eNB and for DCI formats scheduling the PUSCH transmissions. This is referred to as UL HARQ reference TDD UL-DL configuration. The UL HARQ reference TDD UL-DL configuration can be the same as the conventional TDD UL-DL configuration used in the cell.

TABLE 2

Flexible SFs (F) for TDD UL-DL configurations

| TDD UL-DL Configuration | DL-to-UL Switch-point periodicity | SF number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | F | F | D | F | F | F | F |
| 1 | 5 ms | D | S | U | F | D | D | F | F | F | D |
| 2 | 5 ms | D | S | U | D | D | D | F | F | D | D |
| 3 | 10 ms | D | S | U | F | F | D | D | D | D | D |
| 4 | 10 ms | D | S | U | F | D | D | D | D | D | D |
| 5 | 10 ms | D | S | U | D | D | D | D | D | D | D |
| 6 | 5 ms | D | S | U | F | F | D | F | F | F | D |

Low cost UEs, such as Machine-Type Communication (MTC) UEs, typically require low operational power consumption and are expected to communicate with infrequent small burst transmissions. Low cost UEs need to be supported in both FDD and TDD systems. In addition, low cost UEs can be deployed deep inside buildings or, generally, in locations experiencing significantly larger penetration losses than conventional UEs and can require significant coverage enhancements relative to a conventional cell coverage footprint. In extreme coverage scenarios, low cost UEs can have characteristics such as very low data rate, large delay tolerance, and limited mobility, thereby potentially being capable to operate without some messages/channels. Required system functionalities for low cost UEs in an enhanced coverage operating mode can include synchronization, cell search, power control, random access process, channel estimation, measurement reporting, and DL/UL data transmission (including DL/UL resource allocation). Not all low cost UEs require coverage enhancement or require a same amount of coverage enhancement. Therefore, as coverage enhancements for physical channels consume additional resources and consequently result to lower spectral efficiency, it is beneficial to enable associated techniques only for low cost UEs that require such coverage enhancements.

Existing designs may not satisfy a required coverage enhancement for all deployment scenarios of low cost UEs as a coverage enhancement as large as, for example, 15 dB can be required. In addition, in different deployment scenarios, a required coverage enhancement can be different for different eNBs, for example depending on an eNB transmission power or an associated cell size, as well as for different low cost UEs, for example depending on a location of a low cost UE.

Due to a potentially large number of repetitions required for EPDCCH and PDSCH or PUSCH to be reliably received when an eNB, such as eNB 102, communicates with coverage limited low cost UE, such as UE 114, a power consumption of a coverage limited low cost UE is an important consideration.

Assuming that a low cost UE, such as UE 114, cannot simultaneously receive multiple PDSCHs or transmit multiple PUSCHs, it is beneficial for a network to avoid transmitting EPDCCHs that would lead to such events. Then, a timeline needs to be defined for transmissions of EPDCCH repetitions and for transmissions of PDSCH repetitions or PUSCH repetitions that are scheduled by a DCI format conveyed by the EPDCCH repetitions. Moreover, for similar reasons as for adaptively adjusting a number of EPDCCH repetitions, it is beneficial to adjust a number of PDSCH repetitions or a number of PUSCH repetitions.

Finally, a low cost UE, such as UE 114, needs to provide acknowledgement information regarding a reception of a PDSCH to an eNB, such as eNB 102, in order to minimize data packet losses and utilize benefits of using a hybrid automatic repeat request process.

Embodiments of this disclosure provide time (SFs) and frequency (RBs) resources for EPDCCH repetitions. Embodiments of this disclosure also provide restrictions in SFs for EPDCCH transmissions in order to provide power savings to a low cost UE. Additionally, embodiments of this disclosure provide mechanisms to combine CCEs of a PDCCH and ECCEs of an EPDCCH in order to reduce a number of SFs required for scheduling a low cost UE and therefore provide power savings to the low cost UE. Embodiments of this disclosure further provide mechanisms to support EPDCCH repetitions in conjunction with an existence of MBSFN/ABS SFs. Embodiments of this disclosure also provide timing for EPDCCH repetitions in case of multiple EPDCCH repetition numbers. Additionally, embodiments of this disclosure provide a search space design for EPDCCH repetitions over multiple SFs. Embodiments of this disclosure further provide mechanisms to support HARQ-ACK transmissions from UEs using repetitions. Embodiments of this disclosure also provide mechanisms for DRX operation for a UE operating in coverage enhanced mode. Additionally, embodiments of this disclosure provide mechanisms for paging operation for a UE operating in coverage enhanced mode. Embodiments of this disclosure further provide resources for PDSCH repetitions. Embodiments of this disclosure also provide resources for PUSCH repetitions. Finally, embodiments of this disclosure provide mechanisms to support monitoring of one or multiple timelines for EPDCCH repetitions.

The following embodiments are not limited to low cost UEs and can be applicable to any type of UEs requiring an enhancement in coverage beyond a coverage supported by a conventional operation. Moreover, although the descriptions consider SF structures with symbols having a normal Cyclic Prefix (CP), they are also applicable for SF structures with symbols having a extended CP (see also REF 1).

Time and Frequency Resources for EPDCCH Repetitions

Higher layer signaling, such as RRC signaling, can inform a low cost UE, such as UE 114, using, for example, an information element ConfigureEPDCCH-Repetition, a configuration of resources for EPDCCH transmissions (or repetitions) to achieve an EPDCCH coverage enhancement level. The configuration of resources for the repetitions of an EPDCCH transmission can include, for example, information for a number of repetitions of an EPDCCH conveying a DCI format, resources in time (for example, SF(s)) including a time resource for a first repetition of the EPDCCH transmission, resources within each allocated SF (for example, ECCE(s)), ECCE aggregation levels, and a number of EPDCCH candidates for each ECCE aggregation level. The DCI format is assumed to be same for PDSCH scheduling and for PUSCH scheduling and, if the low cost UE monitors multiple DCI formats, it is assumed to be a reference DCI format. For example, in a FDD system, the resources in time can include all SFs where EPDCCH can be transmitted, a starting SF for a first repetition of an EPDCCH transmission (for example, a SF within a frame identified by an SFN and an offset from 0 to 9), a total number of ECCEs in each SF, an ECCE aggregation level, and a number of EPDCCH candidates for each respective ECCE aggregation level.

A respective configuration can be omitted from ConfigureEPDCCH-Repetition if it is determined by the system operation and/or by other parameters configured to a low cost UE. For example, a total number of ECCEs can be determined from a number of RBs allocated for EPDCCH transmission in a SF (see also REF 3). For example, a single, maximum ECCE aggregation level can be predefined for an EPDCCH transmission to coverage limited UE. For example, a predetermined number of EPDCCH candidates can be used for a respective ECCE aggregation level (if more than one). For example, a predetermined number of EPDCCH candidates can be used for a respective EPDCCH repetition level. For example, a SF for a first EPDCCH transmission can be determined by a C-RNTI assigned to a coverage limited UE and by a SFN and by other parameters as is subsequently described. If an approach from the following approaches for transmitting EPDCCH repetitions does not require some of the previous parameters, a configuration or a determination of those parameters is omitted from ConfigureEPDCCH-Repetition. Then, ConfigureEPDCCH-Repetition can potentially include only one or more possible numbers for EPDCCH repetitions in respective SFs.

If multiple repetitions exist for an EPDCCH transmission conveying a DCI format, a low cost UE can perform soft combining of demodulated encoded bits prior to decoding among all respective received repetitions for the DCI format that are assumed to be transmitted in respective EPDCCHs at resources already known to the low cost UE.

In a first approach, ConfigureEPDCCH-Repetition configures to a low cost UE one or more of the following parameters:

Number of EPDCCH repetitions, $N_{EPDCCH}$, that convey a same DCI format. As it is subsequently discussed, a low cost UE can be configured with more than one EPDCCH repetition numbers. Different low cost UEs can have different numbers of EPDCCH repetitions, for example according to a respective coverage enhancement level.

A starting SF, $n_{s0}$, for a first repetition of a first EPDCCH transmission.

A starting SFN, $Z_0$, for a first repetition of a first EPDCCH transmission.

A first repetition for EPDCCH transmission y can be in a SF with index $n_s$ within a frame with SFN Z for $N_{EPDCCH}$ repetitions that can be determined as in Equation 1

$$n_s = (n_{s0} + y \cdot N_{EPDCCH}) \bmod D,$$

$$Z = Z_0 + \lfloor (n_{s0} + y \cdot N_{EPDCCH})/D \rfloor \quad (1)$$

where $\lfloor \rfloor$ is the 'floor' function that rounds a number to its immediately smaller integer, $n_{s0} = 0, 1, \ldots, D-1$ is an initial DL SF of a first repetition of an EPDCCH transmission in a frame with SFN Z, $y = 0, 1, \ldots, \lfloor 1024 \cdot D/N_{EPDCCH} \rfloor - 1$, and D is the number of DL SFs where EPDCCH can be transmitted in a frame. For example, D=10 for a FDD system and D can be derived from a UL-DL configuration for a TDD system. Alternatively, a configuration of $n_{s0}$ or $Z_0$ can be omitted and respective values can be set to '0', and $n_s = (y \cdot N_{EPDCCH}) \bmod D$, $Z = \lfloor (y \cdot N_{EPDCCH})/D \rfloor$.

Equivalently, a starting SF for each of $N_{EPDCCH}$ repetitions of an EPDCCH transmission can be determined as a DL SF having an index $n_s$ within a frame with SFN Z that satisfies Equation 1a:

$$((Z - Z_0) \cdot D + n_s - n_{s0}) \bmod N_{EPDCCH} = 0 \quad (1a)$$

Figure 9A:
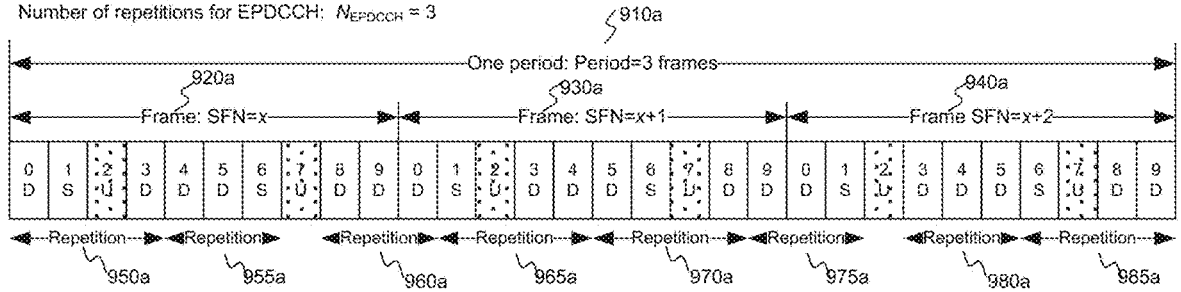
FIG. 9A illustrates an example configuration of resources for EPDCCH repetitions according to this disclosure.

FIG. 9A illustrates an example configuration of resources for EPDCCH repetitions according to this disclosure. The embodiment of the configuration of resources for EPDCCH repetitions shown in FIG. 9A is for illustration only. Other embodiments could be used without departing from the scope of the present disclosure.

In the example shown in FIG. 9A, for TDD UL-DL configuration 2, D=8. In a period of 3 frames 910a with the three frames being 920a, 930a, 940a, $N_{EPDCCH}=3$, $n_{s0}=0$ and $Z_0=0$. Therefore, $\lfloor 3 \cdot D/N_{EPDCCH} \rfloor = 8$. The first triplet of EPDCCH repetitions can be the first three of the D SFs in a frame with SFN mod 3=0. Up to eight triplets of repetitions can be supported, 950a, 955a, 960a, 965a, 970a, 975a, 980a, and 985a, with $n_s=0$, $n_s=(0+3) \bmod 8=3$, $n_s=(0+2*3) \bmod 8=6$, $n_s=(0+3*3) \bmod 8=1$, $n_s=(0+4*3) \bmod 8=4$, $n_s=(0+5*3) \bmod 8=7$, $n_s=(0+6*3) \bmod 8=2$, and $n_s=(0+7*3) \bmod 8=5$, respectively.

Alternatively, ConfigureEPDCCH-Repetition can provide a value for a number of EPDCCH transmissions where each EPDCCH transmission is with $N_{EPDCCH}$ repetitions and indicate explicitly a starting SF for a first repetition of a first EPDCCH transmission.

In a second approach, ConfigureEPDCCH-Repetition additionally configures to a low cost UE a parameter $O_s$ that indicates an offset relative to $n_{s0}$, the initial DL SF for an EPDCCH repetition. For example, $O_s = 0, 1, \ldots, N_{EPDCCH} - 1$. The starting EPDCCH SF can be determined similar to the first approach but with Equation 1 replaced by Equation 2:

$$n_s = (n_{s0} + O_s + y \cdot N_{EPDCCH}) \bmod D,$$

$$Z = Z_0 + \lfloor (n_{s0} + O_s + y \cdot N_{EPDCCH})/D \rfloor \quad (2)$$

or with equation (1a) replaced by Equation (2a):

$$((Z - Z_0) \cdot D + n_s - n_{s0} - O_s) \bmod N_{EPDCCH} = 0 \quad (2a).$$

The parameter $O_s$ can be different for different low cost UEs and the parameter $O_s$ can be obtained from a mapping function of parameters related to a low cost UE, such as UE 114. For example, $O_s$ can be a function of a C-RNTI of a low cost UE, such as $O_s = (C\text{-}RNTI) \bmod N_{EPDCCH}$. Alternatively, $O_s$ can be a function of UE identifier (UE_ID) of a low cost UE (which can be a global identifier of the low cost UE), such as $O_s = (UE\_ID) \bmod N_{EPDCCH}$.

As an alternative, in Equation 1, Equation 1a, Equation 2, and Equation 2a, $n_{s0}$ can be different for different low cost UEs and it can be obtained from a mapping function of parameters related to the low cost UE. For example, a starting SF $n_{s0}$ can be defined to be a function of C-RNTI of the low cost UE, such as $n_{s0} = (C\text{-}RNTI) \bmod D$. This distributes a starting SF for different low cost UEs within D SFs of a frame where EPDCCH can be transmitted. Alternatively, $n_{s0}$ can be a function of UE identifier (UE_ID) of the low cost UE (which can be a global identifier of a UE), such as $n_{s0} = (UE\_ID) \bmod D$. If $O_s$ or $n_{s0}$ can be determined by a predefined function, they can be omitted from ConfigureEPDCCH-Repetition and a low cost UE can derive $O_s$ or $n_{s0}$ based on the predetermined function and other system parameters.

In a third approach, ConfigureEPDCCH-Repetition additionally configures, explicitly or implicitly, to a low cost UE a parameter $Gap_{EPDCCH}$ that indicates a number of DL SFs between two successive EPDCCH transmissions each having $N_{EPDCCH}$ repetitions. The parameter $Gap_{EPDCCH}$ can be used to provide flexibility for EPDCCH transmissions in non-successive SFs. For example, $Gap_{EPDCCH}$ can be equal to a number of SFs, $N_{PDSCH}$, for PDSCH repetitions or, if $N_{PDSCH} \geq N_{EPDCCH}$, it can be equal to $N_{PDSCH} - N_{EPDCCH}$. Alternatively, $Gap_{EPDCCH}$ can be explicitly indicated to the low cost UE from the eNB by higher layer signaling.

A starting EPDCCH SF can be determined similar to the first approach, but with Equation 1 replaced by Equation 3:

$$n_s = (n_{s0} + y \cdot (N_{EPDCCH} + Gap_{EPDCCH})) \bmod D,$$

$$Z = Z_0 + \lfloor (n_{s0} + y \cdot (N_{EPDCCH} + Gap_{EPDCCH}))/D \rfloor \quad (3)$$

where $y = 0, 1, \ldots, \lfloor 1024 \cdot D/(N_{EPDCCH} + Gap_{EPDCCH}) \rfloor - 1$, or with Equation 1a replaced by Equation 3a:

$$((Z - Z_0) \cdot D + n_s - n_{s0}) \bmod (N_{EPDCCH} + Gap_{EPDCCH}) = 0 \quad (3a).$$

Figure 9B:
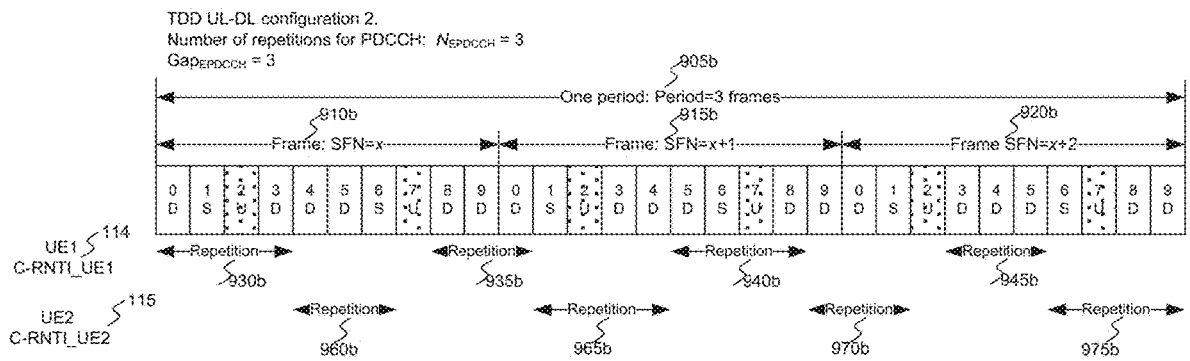
FIG. 9B illustrates an example configuration of resources for EPDCCH repetitions when $Gap_{EPDCCH}$ is used and an example use of different $n_{s0}$ by different UEs according to this disclosure.

FIG. 9B illustrates an example configuration of resources for EPDCCH repetitions when $Gap_{EPDCCH}$ is used and an example use of different $n_{s0}$ by different UEs according to this disclosure. The embodiment of the configuration of resources for EPDCCH repetitions when $Gap_{EPDCCH}$ is used shown in FIG. 9B is for illustration only. Other embodiments could be used without departing from the scope of the present disclosure.

In the example shown in FIG. 9B, for TDD UL-DL configuration 2, D=8 and $N_{EPDCCH}=3$. For a period of 3 frames 905b, with the three frames being 910b, 915b, 920b, it is $\lfloor 3 \cdot D/(N_{EPDCCH}+Gap_{EPDCCH})\rfloor=4$. For UE1, $O_s=0$ and $n_{s0}=0$. Up to four triplets of repetitions can be supported, 930b, 935b, 940b, and 45b, with $n_s=0$, $n_s=(0+(3+3))$mod $8=6$, $n_s=(0+2*(3+3))$mod $8=4$, and $n_s=(0+3*(3+3))$mod $8=2$, respectively. For UE2, $n_{s0}=3$. Up to four triplets of repetitions can be supported, 60b, 65b, 70b, and 75b, with $n_s=3$, $n_s=(3+(3+3))$ mod $8=1$, $n_s=(3+2*(3+3))$mod $8=7$, and $n_s=(3+3*(3+3))$mod $8=5$, respectively.

Figure 10A:
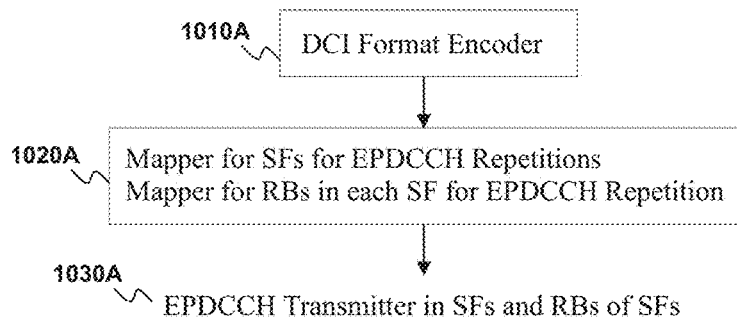
FIG. 10A illustrates an example diagram for an eNB transmitting EPDCCH repetitions according to this disclosure.

FIG. 10A illustrates an example diagram for an eNB transmitting EPDCCH repetitions according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a base station.

An encoded DCI format in block 1010A is mapped for transmission in an EPDCCH repetition to a respective SF, from a number of $N_{EPDCCH}$ SFs, and RBs for the SF in block 1020A, for example as described in FIG. 9B or Equation 3a, and an EPDCCH transmitter is subsequently used to transmit the EPDCCH repetition in the RBs for the SFs in block 1030A.

Figure 10B:
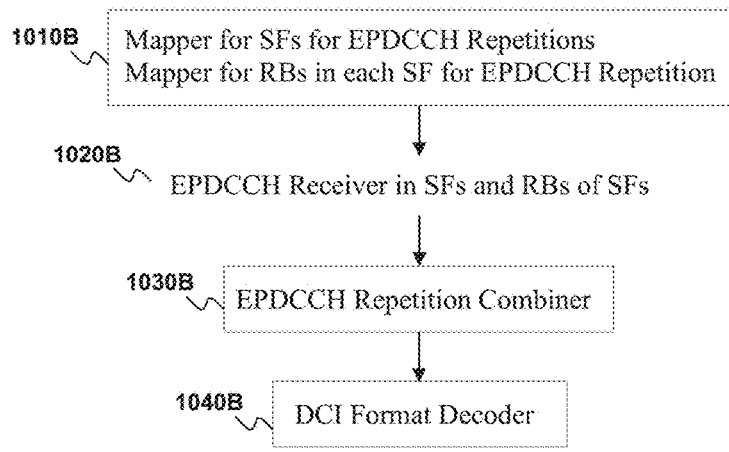
FIG. 10B illustrates an example diagram for a UE receiving EPDCCH repetitions according to this disclosure.

FIG. 10B illustrates an example diagram for a UE receiving EPDCCH repetitions according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 10B, a repetition for an EPDCCH transmission is mapped to a SF and RBs for the SF in a number of $N_{EPDCCH}$ SFs in block 1010B, for example as described in FIG. 9B or Equation 3a, and an EPDCCH receiver is subsequently used to receive the EPDCCH repetition in the RBs of the SFs in block 1020B. After a number of SFs that can be smaller than or equal to $N_{EPDCCH}$ SFs, respective EPDCCH repetitions are combined in block 1030B and the combined EPDCCH is provided to a DCI format decoder in block 1040B.

In a fourth approach, ConfigureEPDCCH-Repetition additionally configures to a low cost UE the parameter $N_{PDSCH}$ that indicates a number of DL SFs for repetitions of a PDSCH transmission. Alternatively, $N_{PDSCH}$ can be configured to the low cost UE by higher layer signaling using a different information element than ConfigureEPDCCH-Repetition. ConfigureEPDCCH-Repetition can also configure a parameter $Gap_{EPDCCH\_PDSCH}$ that indicates a number of DL SFs from a last EPDCCH SF to a first PDSCH SF (if this number is different than 0). Alternatively, $Gap_{EPDCCH\_PDSCH}$ can be predetermined in a system operation. Then, $Gap_{EPDCCH}$ in the third approach and in Equation 3 or Equation 3a can be determined, for example, as $Gap_{EPDCCH}=Gap_{EPDCCH\_PDSCH}+N_{PDSCH}-N_{EPDCCH}$. If $N_{PDSCH}-N_{EPDCCH}\geq0$, $Gap_{EPDCCH}$ can be determined, for example, as $Gap_{EPDCCH}=N_{PDSCH}-N_{EPDCCH}$. With the fourth approach, information related to PDSCH repetitions can be used to derive the timing for EPDCCH repetitions. The parameter $Gap_{EPDCCH}$ in the third approach does not need to be signaled if it can be determined by parameters as indicated in the fourth approach.

Figure 11:
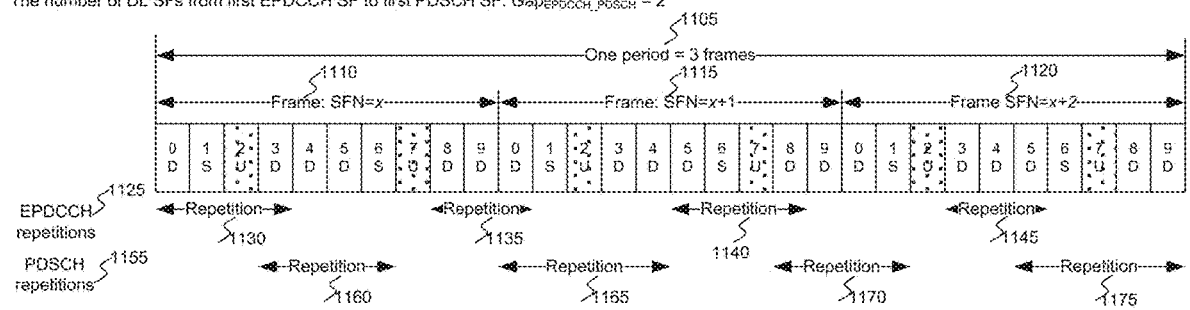
FIG. 11 illustrates an example configuration of resources for EPDCCH repetitions when using $N_{PDSCH}$ and $Gap_{EPDCCH\_PDSCH}$ according to this disclosure.

FIG. 11 illustrates an example configuration of resources for EPDCCH repetitions when using $N_{PDSCH}$ and $Gap_{EPDCCH\_PDSCH}$ according to this disclosure. The embodiment of the configuration of resources for EPDCCH repetitions when using $N_{PDSCH}$ and $Gap_{EPDCCH\_PDSCH}$ shown in FIG. 11 is for illustration only. Other embodiments could be used without departing from the scope of the present disclosure.

In the example shown in FIG. 11, for TDD UL-DL configuration 2, $D=8$, $N_{EPDCCH}$, $N_{PDSCH}=4$, $Gap_{EPDCCH\_PDSCH}=2$ and an EPDCCH transmission period is 3 frames 1105 with the three frames being 1110, 1115, 1120. It is $O_s=0$ and $n_{s0}=0$. The first triplet of EPDCCH repetitions can be the first three DL SFs in a frame with SFN mod $3=0$. $Gap_{EPDCCH}=Gap_{EPDCCH\_PDSCH}+N_{PDSCH}-N_{EPDCCH}=3$ and $\lfloor 3 \cdot D/(N_{EPDCCH}+Gap_{EPDCCH})\rfloor=4$. Up to four triplets of repetitions can be supported, 1130, 1135, 1140, and 845, with $n_s=0$, $n_s=(0+(3+3))$mod $8=6$, $n_s=(0+2*(3+3))$mod $8=4$, and $n_s=(0+3*(3+3))$mod $8=2$, respectively, for the starting EPDCCH SF indexed within frame for EPDCCH triplets. For $Gap_{EPDCCH\_PDSCH}=2$, a starting SF for each quadruplet of repetitions for a PDSCH transmission is shifted by two DL SFs relative to a starting SF for EPDCCH repetitions.

Figure 12:
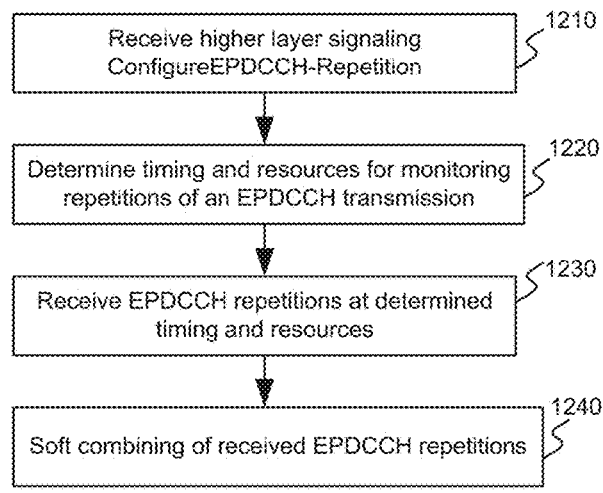
FIG. 12 illustrates example operations for a low cost UE to detect an EPDCCH according to this disclosure.

FIG. 12 illustrates example operations for a low cost UE to detect an EPDCCH according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

A low cost UE, such as UE 114, receives higher layer signaling of an information element ConfigureEPDCCH-Repetition in block 1210. The low cost UE determines the timing (SFs) and resources (ECCEs) in each SF for monitoring an EPDCCH transmission in block 1220 based on ConfigureEPDCCH-Repetition. The low cost UE receives the repetitions of an EPDCCH transmission at the determined timing and resources in block 1230. The low cost UE can perform soft-combining of received EPDCCH repetitions in block 1240. The remaining steps for a low cost UE to decode a DCI format conveyed by the EPDCCH repetitions are as in FIG. 6.

Restrictions in SFs for EPDCCH Transmissions

To limit power consumption by a low cost UE, such as UE 114, the low cost UE can be restricted to monitor EPDCCH only in a subset of possible DL SFs. EPDCCH transmissions from eNB 102 to the low cost UE can be restricted to occur in certain SFs or frames by defining respective time windows $W_{EPDCCH}$ of DL SFs. Restrictions in SFs for EPDCCH transmissions can allow for power savings as the low cost UE can turn off its receiver in SFs outside a window where EPDCCH transmissions can exist. Therefore, power savings benefits similar to SPS exist but, unlike SPS, UL resource waste when the low cost UE has no data to transmit is avoided and scheduling restrictions for DL transmissions at predefined SFs or frequency resources are also avoided.

Higher layer signaling, such as RRC signaling, can inform a low cost UE, such as UE 114, using for example an information element ConfigureEPDCCH (can be same as ConfigureEPDCCH-Repetition in case of coverage limited operation), a configuration of one or multiple time windows where EPDCCH transmissions can exist or, equivalently, of one or multiple time windows where EPDCCH repetitions cannot exist. As the latter windows can be derived from the former windows and the reverse, it is sufficient to inform a low cost UE only of the former windows or only of the latter windows. The windows for EPDCCH transmissions can be defined, for example, according to one or more parameters that include a SFN, multiples of SFN cycles, a number of EPDCCH repetitions, a C-RNTI of a low cost UE, a UE identifier of a low cost UE, and so on.

In a first alternative, a pattern of first time windows for EPDCCH transmissions to a low cost UE, such as UE 114, can be included in ConfigureEPDCCH. A pattern can be defined by a period having duration $P_{EPDCCH}$, for example in a unit of a SFN or a SFN cycle that consists of 1024 frames. Each first time window for EPDCCH transmissions includes a second time window where EPDCCH can be transmitted and a third window where EPDCCH cannot transmitted. For example, at the start of each $P_{EPDCCH}$, EPDCCH transmissions can exist within a second time window having duration of $T_{EPDCCH}$ defined, for example, in a unit of a SFN or a SFN cycle (and cannot exist within a third time window having duration of $P_{EPDCCH}-T_{EPDCCH}$). A starting time of a first window for EPDCCH transmissions or of a second window where EPDCCH transmissions can exist can be either included in the pattern, or can be predefined, or can be derived from other parameters such as a C-RNTI or the UE_ID for the low cost UE.

Additionally, a low cost UE can derive some of the parameters of a pattern for time-restricted EPDCCH transmissions from remaining parameters and such parameters do not need to be configured. For example, a pattern can be defined from three parameters; a starting time of a period for the pattern, a duration $P_{EPDCCH}$ (size of first window), and a duration $T_{EPDCCH}$ (size of second window). The starting time for the first window can be, for example, same as the starting time of the second window where EPDCCH transmissions can exist. For example, starting periods for both the first window and the second window can be derived, as a function of a SFN, or from a C-RNTI or a UE_ID for the low cost UE and need not be signaled.

In a second alternative, the parameters $P_{EPDCCH}$ and $T_{EPDCCH}$ are derived from a mapping or function for a number of EPDCCH repetitions (for example, a maximum number of EPDCCH repetitions) configured to a low cost UE.

In a first representation, $T_{EPDCCH}$ can be equal to $N \cdot N_{EPDCCH}$ EPDCCH SFs where N is an integer and $N_{EPDCCH}$ is a number of EPDCCH repetitions and both N and $N_{EPDCCH}$ can be configured to a low cost UE, such as UE 114, from an eNB, such as eNB 102, by higher layer signaling. For example, $N_{EPDCCH}$ can be a maximum number of EPDCCH repetitions configured to the low cost UE.

In a second representation, $T_{EPDCCH}$ can be a number of $N \cdot (N_{EPDCCH}+Gap_{EPDCCH})$ DL SFs, where $Gap_{EPDCCH}$ is a number of DL SFs between two EPDCCH repetitions with each EPDCCH transmission including repetitions over $N_{EPDCCH}$ DL SFs. Alternatively, $T_{EPDCCH}$ can be a number of $N \cdot W_{EPDCCH}$ DL SFs, where $W_{EPDCCH}$ includes $N_{EPDCCH}$ DL SFs and a gap (if any) of DL SFs between two EPDCCH repetitions, $Gap_{EPDCCH}$, wherein each repetition includes $N_{EPDCCH}$ DL SFs. The parameter $W_{EPDCCH}$ can be explicitly signaled to the low cost UE from the eNB by higher layer signaling or it can be derived as, for example, $W_{EPDCCH}=N_{EPDCCH}+Gap_{EPDCCH}$ where $Gap_{EPDCCH}$ can be configured to a low cost UE by higher layer signaling.

$W_{EPDCCH}$ and $N_{EPDCCH}$ can be counted based on DL SFs or based on DL SFs excluding DL SFs where EPDCCH can be assumed by a low cost UE as not being transmitted. The low cost UE can be informed of such SFs by higher layer signaling and can exclude them in a counting for $N_{EPDCCH}$ repetitions. In the following, unless specifically mentioned, counting for $W_{EPDCCH}$, $N_{EPDCCH}$ repetitions excludes SFs where EPDCCH cannot be transmitted.

A starting time of a period for a pattern of a first time window for time-restricted EPDCCH repetitions can be derived from a mapping or function of SFN, an initial SFN, a SF number, an initial SF number, and a C-RNTI or UE identifier of a low cost UE. For example, a starting time of a period for a pattern for time-restricted EPDCCH transmissions (first window) can be determined as a SF with index $n_s$ in a frame with SFN=Z satisfying Equation 4:

$$((Z-Z_0) \cdot D + n_s) \bmod P_{EPDCCH} = n_{s0} \qquad (4)$$

where D is a number of SFs in each frame where EPDCCH can be transmitted (e.g. excluding UL SFs in a TDD system or MBMSN SFs), and $Z_0$ and $n_{s0}$ are respectively and initial SFN and an initial SF for EPDCCH transmissions that can be signaled or derived from a mapping function such as UE_ID mod S where UE_ID is an identifier of a UE (for example, C-RNTI, or UE's global ID, etc.) and S is a predefined integer. The term UE_ID mod S provides an offset that can be different for different low cost UEs. For $Z_0=n_{s0}=0$, a starting time of a period for a pattern for time-restricted EPDCCH transmissions can be determined as a SF with index $n_s$ in a frame with SFN=Z satisfying $(Z \cdot D + n_s) \bmod P_{EPDCCH} = 0$.

A pattern for time-restricted EPDCCH transmissions can also be reconfigured and new parameters related to a new pattern can be informed to a low cost UE prior to an effective time of the new pattern.

Figure 13:
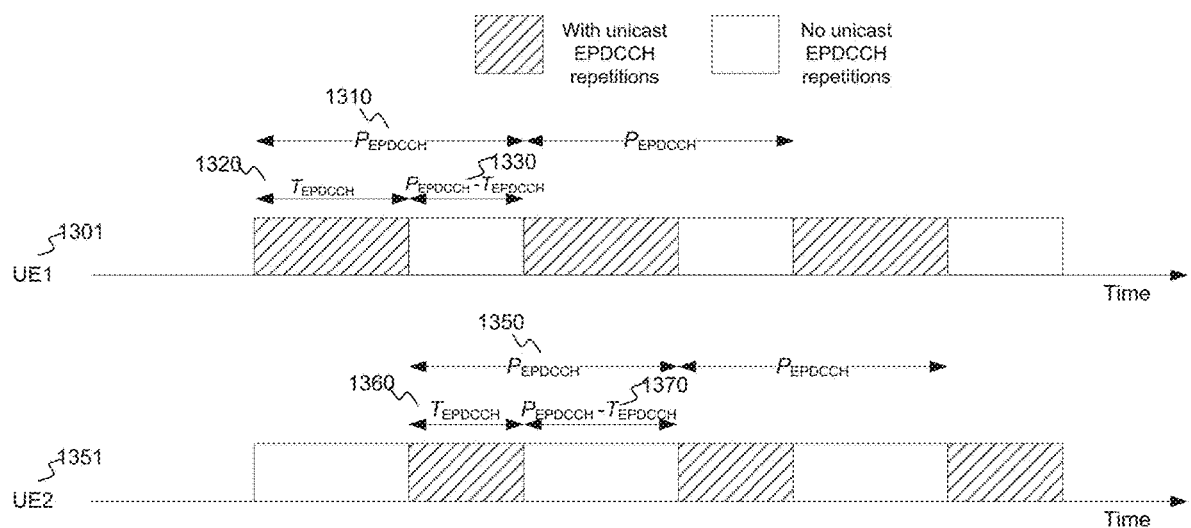
FIG. 13 illustrates an example configuration of patterns for time-restricted EPDCCH transmissions according to this disclosure.

FIG. 13 illustrates an example configuration of patterns for time-restricted EPDCCH transmissions according to this disclosure. The embodiment of the configuration of patterns for time-restricted EPDCCH transmissions shown in FIG. 13 is for illustration only. Other embodiments could be used without departing from the scope of the present disclosure.

Referring to FIG. 13, low cost UE #1 1301 is configured with a period $P_{EPDCCH,1}$ for a first window for EPDCCH transmissions 1310, and a period $T_{EPDCCH,1}$ for a second window where it can assume that EPDCCH transmissions can exist 1320. Low cost UE #1 can then derive a third window $P_{EPDCCH,1}-T_{EPDCCH,1}$ where it can assume that EPDCCH transmissions do not exist 1330. Low cost UE #2 1351 is configured with a period $P_{EPDCCH,2}$ for a first window for EPDCCH transmissions 1350, a period $T_{EPDCCH,2}$ 1360 for a second window where it can assume that EPDCCH transmissions can exist 1360, and can then derive a third window $P_{EPDCCH,2}-T_{EPDCCH,2}$ where it can assume that EPDCCH transmissions do not exist 1370. The starting times of $P_{EPDCCH}$ or $T_{EPDCCH}$, for low cost UE #1 and low cost UE #2 are differently offset based on respective UE IDs.

In an alternative to using time restricted EPDCCH transmissions, a conventional DRX operation can be modified in case a low cost UE is configured with EPDCCH repetitions. For a low cost UE configured with a maximum number of $N_{EPDCCH}$ repetitions for an EPDCCH conveying a DCI format, a drx-InactivityTimer can be defined using a unit of $N_{EPDCCH}$ DL SFs instead of a unit of a single DL SF. This applies even when the low cost UE can detect a DCI format with less than $N_{EPDCCH}$ EPDCCH repetitions, for example if the low cost UE is configured to decode multiple EPDCCH repetition numbers and $N_{EPDCCH}$ is the maximum repetition number. Similar, an onDurationTimer can be defined using a unit of $N_{EPDCCH}$ DL SFs even when the low cost UE can detect a DCI format with less than $N_{EPDCCH}$ EPDCCH repetitions. In addition, a definition of a DRX cycle can be modified to support longer DRX cycles. For example, for longDRX-Cycle, the low cost UE can wake up at $\lceil SFN \cdot 10/K + n_s \rceil \mod(\text{longDRX-cycle}) = \text{drxStartOffset}$ where K>1, such as K=100.

ECCEs for EPDCCH Repetitions

When there are $N_{EPDCCH}$ repetitions for an EPDCCH transmission conveying a DCI format, an EPDCCH candidate for a respective ECCE aggregation level in a search space can remain same for all $N_{EPDCCH}$ repetitions. Locations of ECCEs for a candidate EPDCCH repetition, from $N_{EPDCCH}$ repetitions, can vary among SFs as determined by a search space and by RBs where a EPDCCH repetition is transmitted at a respective SF.

Figure 14:
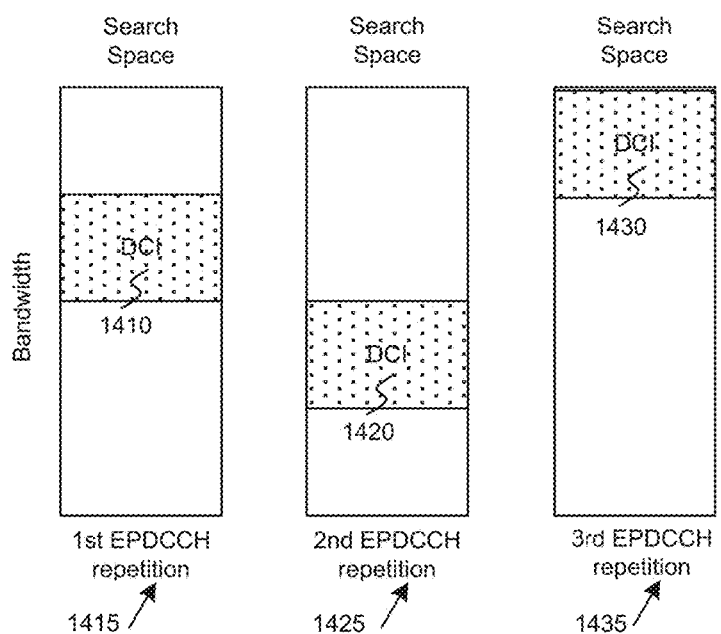
FIG. 14 illustrates example locations of ECCEs in a search space for multiple EPDCCH repetitions conveying a DCI format according to this disclosure

FIG. 14 illustrates example locations of ECCEs in a search space for multiple EPDCCH repetitions conveying a DCI format according to this disclosure. The embodiment of the locations of ECCEs in a search space for multiple EPDCCH repetitions conveying a same DCI format shown in FIG. 14 is for illustration only. Other embodiments could be used without departing from the scope of the present disclosure.

A low cost UE determines a first location of ECCEs 1310 for an EPDCCH candidate 1415 in a search space in a first set of RBs of a first SF. It determines a second location of ECCEs 1420 for the EPDCCH candidate 1425 in a search space in a second set of RBs of a second SF. It determines a third location of ECCEs 1430 for the EPDCCH candidate in a search space in a third set of RBs of a third SF 1435. A same DCI format is conveyed in each of the three EPDCCH repetitions while locations of ECCEs associated with each respective EPDCCH candidate can be different either due to a use of different sets of RBs or due a use of different ECCEs in a same set of RBs for a same EPDCCH candidate in respective different SFs. After identifying the ECCEs for a same EPDCCH candidate in different SFs, the low cost UE then can perform soft-combining prior to decoding a DCI format the low cost UE assumes to be conveyed by each of the EPDCCH repetitions.

An eNB transmitter configured to transmit EPDCCH repetitions, for example as described in FIG. 10A, and a UE receiver configured to receive EPDCCH repetitions, for example as described in FIG. 10B, can further include a mapping for a location of the ECCEs and of the respective RBs for a respective transmission or reception of an EPDCCH repetition in a respective SF.

If ECCEs for an EPDCCH repetition, from $N_{EPDCCH}$ repetitions conveying a same DCI format, fall into a CSS in a SF from a set of SFs, such as SF #0/1/5/9 for FDD, or 0/1/5/6 for TDD), a respective EPDCCH accumulation can be skipped or adjusted by a low cost UE, such as UE 114. For example, the set of SFs can be signaled to the low cost UE by an eNB, such as eNB 102, for example by higher layer signaling, or can be predefined in a system operation, so that the low cost UE can adjust counting of the EPDCCH SFs. The eNB 102 can also skip or adjust a transmission of an EPDCCH repetition in a UE-DSS if respective ECCEs are in a CSS in a SF from a set of SFs or, in general, in any SF. This is because ECCEs of a CSS can be assumed to be used with priority for transmitting EPDCCH conveying UE-common control information.

In a first alternative, when locations of ECCEs for an EPDCCH candidate in a UE-DSS at least partially overlap with locations of ECCEs for a CSS, a low cost UE excludes ECCEs of the EPDCCH candidate for decoding the DCI format. Such EPDCCH candidates can be either compensated at a later SF to keep $N_{EPDCCH}$ fixed or $N_{EPDCCH}$ can be set somewhat larger than necessary to accommodate potential skipped EPDCCH transmissions that are not compensated. In the former case, EPDCCH SFs can be further defined as SFs that exclude SFs where ECCEs for a candidate EPDCCH fall into CSS. The counting can be similar to TDD skipping UL SFs, or EPDCCH SF(s) within a $Gap_{EPDCCH}$ can be used. If EPDCCH SF(s) within a $Gap_{EPDCCH}$ can be used and $Gap_{EPDCCH}$ has enough EPDCCH SFs to compensate for skipped EPDCCH SFs, the timing of EPDCCH transmissions and PDSCH transmissions need not be affected. In the latter case, the timing of EPDCCH transmissions and PDSCH transmissions is not affected when some ECCEs of an EPDCCH candidate in a UE-DSS overlap with ECCEs of a CSS. It is noted that depending on an assumed search space design, when an overlapping among ECCEs of an EPDCCH candidate and ECCEs of a CSS exists, it can always be full overlapping.

Figure 15:
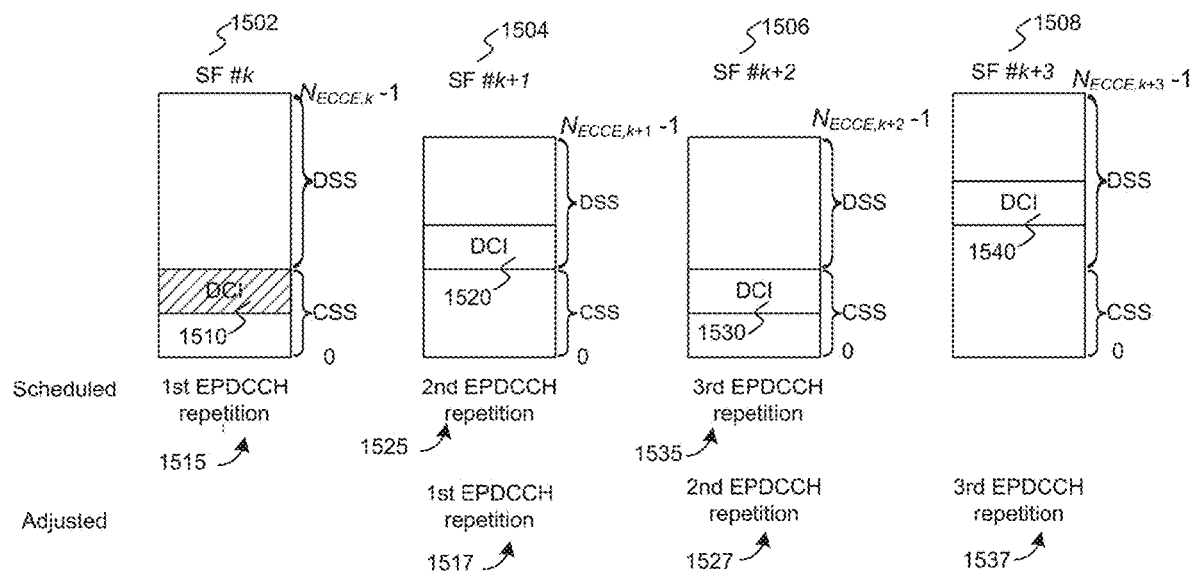
FIG. 15 illustrates an example scenario for a UE to exclude ECCEs of an EPDCCH candidate for decoding a DCI format according to this disclosure

FIG. 15 illustrates an example scenario for a UE to exclude ECCEs of an EPDCCH candidate for decoding a DCI format according to this disclosure. The embodiment of the scenario for a UE to exclude ECCEs of an EPDCCH candidate for decoding a DCI format shown in FIG. 15 is for illustration only. Other embodiments could be used without departing from the scope of the present disclosure.

A low cost UE, such as UE 114, is configured from an eNB, such as eNB 102, by higher layer signaling with $N_{EPDCCH}$=3 EPDCCH repetitions. According to a timing calculation (for example, by approaches described by Equation 6a or Equation 7), a triplet of EPDCCH SFs 1502, 1504, 1506 is determined for a first, second, and third repetitions of an EPDCCH transmission 1515, 1525, 1535 conveying a DCI using a same EPDCCH candidate having ECCE locations 1510, 1520, 1530, respectively. ECCE locations for a UE-DSS in EPDCCH SF 1502 and SF 1506 at least partially overlap with ECCE locations of a CSS. For example, RBs used to transmit EPDCCH for a CSS can at least partially overlap with RBs used to transmit EPDCCH for a UE-DSS. If SF 1502 (but not SF 1506) belongs to a set of SFs within which EPDCCH repetitions should not fall into a CSS, then, the low cost UE can exclude the ECCEs of the EPDCCH candidate in SF 1502 for the decoding of the DCI format and use instead the ECCEs in SF 1508 for the decoding of the DCI format 1540. The adjusted combining of ECCEs will be for the repetitions 1517, 1527, 1537. If in any SF an EPDCCH repetition does not fall into a CSS, then the low cost UE can exclude the ECCEs of the EPDCCH candidate in SF 1502 and SF 1506.

In a second alternative, when locations of ECCEs for an EPDCCH candidate in a UE-DSS at least partially overlap in a SF with locations of ECCEs for a CSS, if partial overlapping can exist, a low cost UE, such as UE 114, only excludes overlapped ECCEs and combines each non-overlapped ECCEs with a respective ECCE having a same index in other EPDCCH repetitions for the same EPDCCH candidate. For example, if for an EPDCCH repetition an EPDCCH candidate for an aggregation level of 16 ECCEs has the first 8 ECCEs overlap with ECCEs of a CSS, the low cost UE excludes the first 8 ECCEs and combines each of the remaining 8 ECCEs with an ECCE having a same index in respective repetition of the EPDCCH candidate in another SF. In order to avoid same ECCEs of an EPDCCH candidate in a UE-DSS overlapping with ECCEs of a CSS, a permutation or a shift can apply in the indexing of ECCEs of an EPDCCH candidate per SF. For example, a cyclic permutation for an indexing of ECCEs for an EPDCCH candidate for an ECCE aggregation level can apply among successive EPDCCH SFs.

In a third alternative, when locations of ECCEs for an EPDCCH candidate in a UE-DSS at least partially overlap in a SF with locations of ECCEs for a CSS, a low cost UE, such as UE 114, assumes that a first EPDCCH candidate having ECCEs that do not overlap with ECCEs for the CSS is used to convey the DCI format in that SF.

In a fourth alternative, for a low cost UE such as UE 114, (indexes of) ECCEs corresponding to an EPDCCH candidate can be configured to be same in every SF and exclude ECCEs for a CSS. For example, different RBs can be used to transmit EPDCCH on a CSS and EPDCCH on a UE-DSS or a set ECCEs in a same set of RBs can be partitioned in a first subset of ECCEs for a CSS and a second subset of ECCEs for a UE-DSS with the first and second subsets not having any common ECCEs. For example, a different set of SFs can be used by the eNB to transmit EPDCCH on a CSS than to transmit EPDCCH on a UE-DSS. Then, a determination of ECCEs for an EPDCCH candidate is not pseudo-random based on a search space location, but it is deterministic and can be configured by higher layer signaling or be fixed in the specifications of the system operation. Alternatively, for interference randomization, a location of ECCEs for a first EPDCCH candidate and a location of ECCEs for a second EPDCCH candidate can be switched in different SFs according to a pseudorandom function having as arguments at least a C-RNTI and a SF number.

Figure 16:
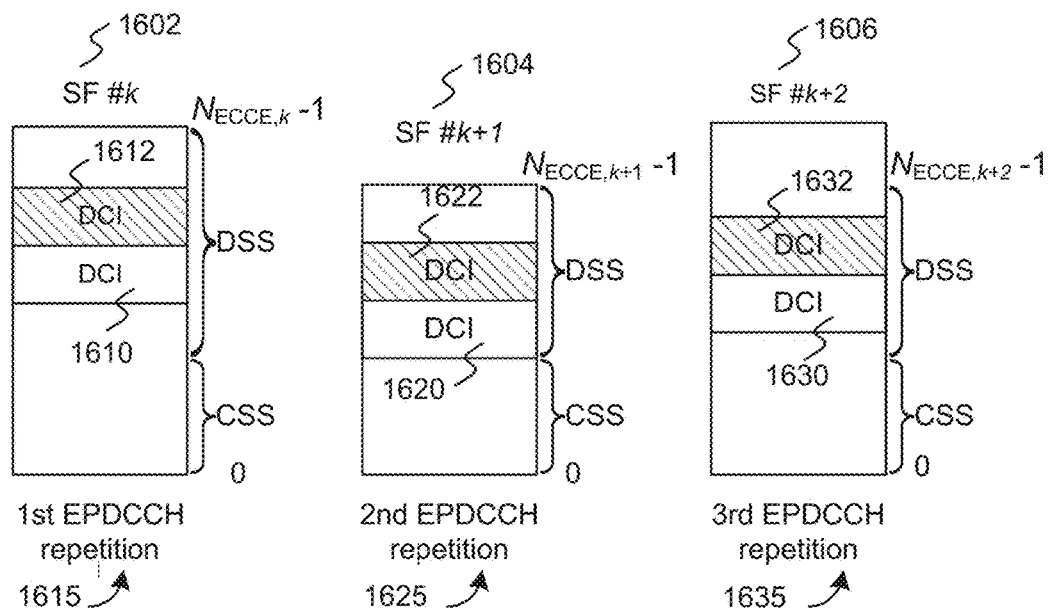
FIG. 16 illustrates an example scenario for ECCEs of an EPDCCH candidate for decoding a DCI format transmitted with EPDCCH repetitions according to this disclosure.

FIG. 16 illustrates an example scenario for ECCEs of an EPDCCH candidate for decoding a DCI format transmitted with EPDCCH repetitions according to this disclosure. The embodiment of the scenario for ECCEs of an EPDCCH candidate for decoding a DCI format transmitted with EPDCCH repetitions shown in FIG. 16 is for illustration only. Other embodiments could be used without departing from the scope of the present disclosure.

A low cost UE, such as UE 114, has a first EPDCCH candidate in 1610, 1620, and 1630 in SF 1602, 1604, and 1606, respectively. It has a second EPDCCH candidate 1612, 1622, and 1632 in the 8 ECCEs located after the 8 ECCEs for the first EPDCCH candidate. As an alternative, for example, in SF 1604, the ECCEs for the second EPDCCH candidate can be the first 8 ECCEs after CSS, while the ECCEs for the first EPDCCH candidate can be the second 8 ECCEs after CSS.

In a fifth alternative, a search space definition is modified to be over a unit of $N_{EPDCCH}$ SFs instead of every SF as in a conventional search space definition (see also REF 3). Therefore, at a first SF of $N_{EPDCCH}$ SFs used for repetitions of an EPDCCH transmission, ECCEs for a candidate EPDCCH location are determined as for a conventional search space and remain same for $N_{EPDCCH}$ SFs in a set of RBs although a location of the set of RBs in a DL transmission bandwidth can change among SFs. For example, a location of a set of RBs for repetitions of an EPDCCH transmission can be same over 2 or 4 consecutive SFs but a different location for the set of RBs can be used for repetitions of the EPDCCH transmission over the next 2 or 4 consecutive SFs.

In general, for a low cost UE receiving a DCI format conveyed by EPDCCH repetitions, such as UE 114, there can be no candidates for the lower ECCE aggregation levels, such as for aggregation levels of 1 ECCE or 2 ECCEs, and all candidates can be allocated to the larger ECCE aggregation level, such as an aggregation level of 16 ECCEs. Furthermore, even larger ECCE aggregation levels can be defined, such as an ECCE aggregation level of 24 ECCEs or an ECCE aggregation level of 32 ECCEs, having respective numbers of EPDCCH candidates.

Combining CCEs of a PDCCH and ECCEs of an EPDCCH

A same DCI format can be conveyed by a PDCCH transmitted in a first DL control region or by an EPDCCH transmitted in a second DL control region (see also REF 3). PDCCH transmissions and EPDCCH transmissions can be, at least in some SFs, in a same SF or can always be in different SFs. For a same DCI format, a low cost UE, such as UE 114, can combine CCEs corresponding to a first candidate for a first CCE aggregation level transmitted using a PDCCH and ECCEs corresponding to a second candidate for a second ECCE aggregation level transmitted using an EPDCCH.

Figure 17:
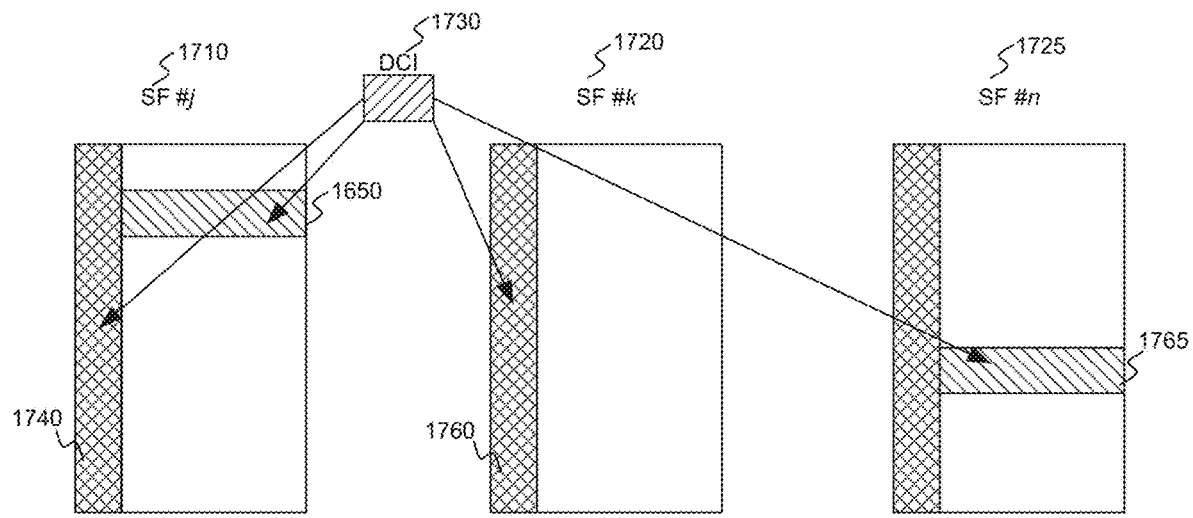
FIG. 17 illustrates an example use of a PDCCH and of an EPDCCH to convey a same DCI format in different SFs according to this disclosure.

FIG. 17 illustrates an example use of a PDCCH and of an EPDCCH to convey a same DCI format in different SFs according to this disclosure. The embodiment of the use of a PDCCH and of an EPDCCH to convey a same DCI format in different SFs shown in FIG. 17 is for illustration only. Other embodiments could be used without departing from the scope of the present disclosure.

A DCI format 1730 can be transmitted in a first DL control region using a PDCCH 1740 and in a second DL control region using an EPDCCH 1750 in a first SF 1710, or can be transmitted in a first DL control region using a PDCCH 1760 in a second SF 1720, or can be transmitted in a second DL control region using an EPDCCH 1765 in a third SF 1725. A low cost UE can combine the CCEs for a respective candidate of a PDCCH and the ECCEs for a respective candidate of an EPDCCH in respective SFs.

EPDCCH Repetitions in Conjunction with Existence of MBSFN/ABS SFs

For EPDCCH repetitions, a reception of an EPDCCH in a SF can be skipped if a low cost UE, such as UE 114, is indicated by higher layer signaling from an eNB, such as eNB 102, that the SF is an ABS one. A reception of an EPDCCH in SF can also be skipped if the low cost UE is indicated by higher layer signaling that the SF is an actual MBSFN one (that is, the SF is used to convey multicast traffic). One approach to avoid the restriction of a low cost UE not receiving EPDCCH in ABS is to use frequency-domain Inter-Cell Interference Coordination (ICIC) where interfering eNBs do not transmit in RBs the eNB 102 transmits EPDCCH. However, this approach is not possible for PDCCH transmissions and the restriction applies.

A UE can determine the SFs where it skips EPDCCH reception either implicitly, from a configuration of ABS or actual MBSFN in a period of frames, or explicitly by higher layer signaling from the eNB. The higher layer signaling can be provided in broadcast signaling, such as a SIB, and can include a bit-map for SFs in a period of frames, where, for example, a binary value of '0' indicates that the eNB transmits EPDCCH in a respective SF and a binary value of '1' indicates that the eNB does not transmit EPDCCH in a respective SF. For a TDD system, UL SFs can be excluded from EPDCCH transmission. Explicit signaling can reduce a signaling overhead as the eNB can potentially avoid signaling to the low cost UE an ABS pattern or a MBSFN pattern. PDSCH can be assumed transmitted in same SFs as EPDCCH.

If an EPDCCH reception in a SF is skipped, EPDCCH candidates can be either compensated at a later SF to keep $N_{EPDCCH}$ fixed or $N_{EPDCCH}$ can be set somewhat larger than necessary to accommodate potential skipped EPDCCH transmissions that are not compensated. In the former case, EPDCCH SFs can be defined as SFs that exclude SFs where the low cost UE is informed by the eNB that EPDCCH cannot be transmitted (such as actual MBSFN SFs or ABS SFs). The counting can be similar to TDD skipping UL SFs, or EPDCCH SF(s) within a $Gap_{EPDCCH}$ can be used. In the latter case, the timing of EPDCCH transmissions and PDSCH transmissions is not affected. If EPDCCH SF(s) within a $Gap_{EPDCCH}$ can be used and $Gap_{EPDCCH}$ has enough EPDCCH SFs to compensate the skipped EPDCCH SFs, the timing of EPDCCH transmissions and PDSCH transmissions is not be affected.

Figure 18:
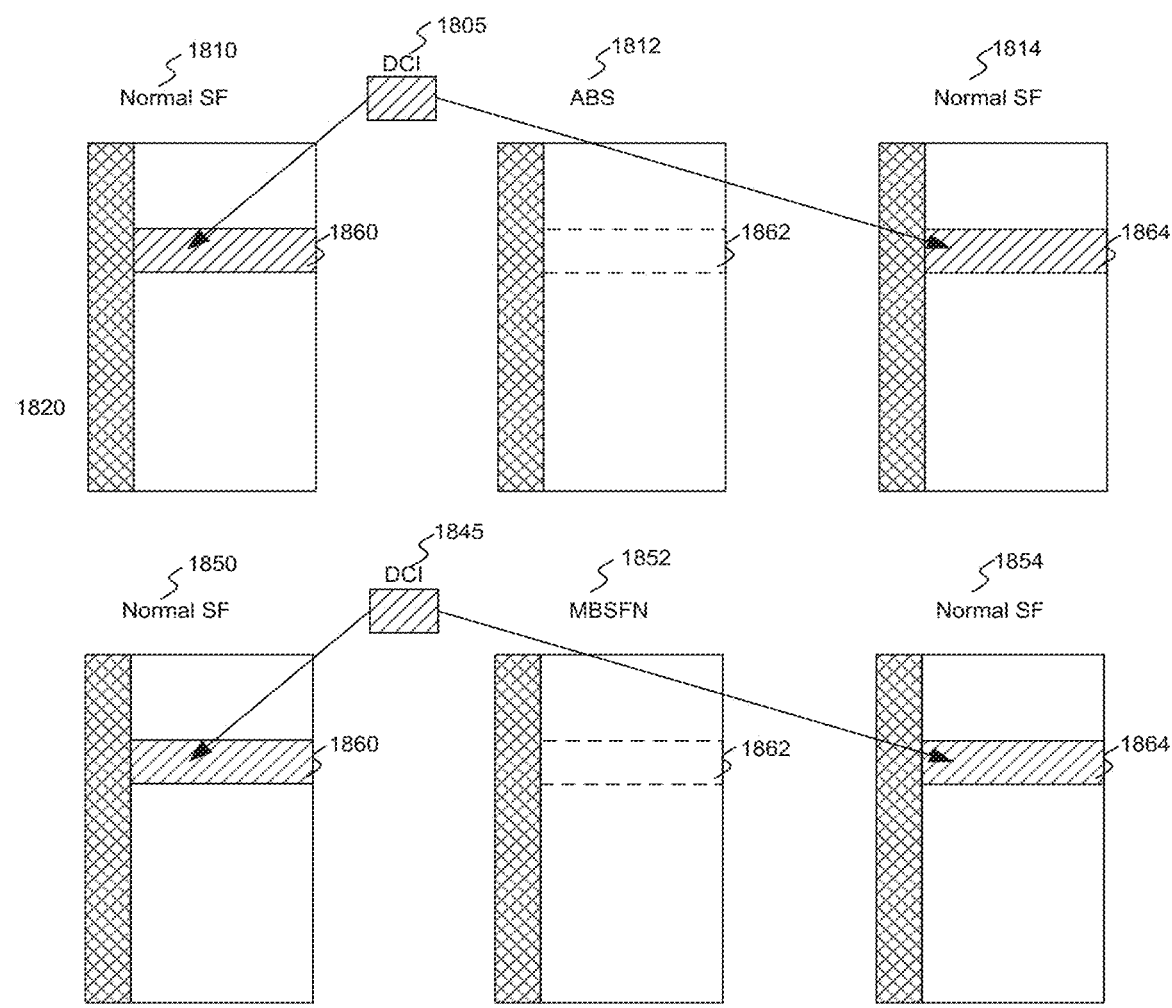
FIG. 18 illustrates a low cost UE excluding a reception of an EPDCCH, in a number of EPDCCH repetitions conveying a same DCI format, depending on a SF type according to this disclosure.

FIG. 18 illustrates a low cost UE excluding a reception of an EPDCCH, in a number of EPDCCH repetitions conveying a same DCI format, depending on a SF type according to this disclosure. The embodiment of a low cost UE excluding a reception of an EPDCCH, in a number of EPDCCH repetitions conveying a same DCI format, depending on a SF type shown in FIG. 18 is for illustration only. Other embodiments could be used without departing from the scope of the present disclosure.

A DCI format 1805 conveyed by repetitions of an EPDCCH in a number of SFs, a low cost UE, such as UE 114, includes an EPDCCH candidate of an ECCE aggregation level for decoding the DCI format if the SF is a normal one (1810, 1814) and excludes an EPDCCH candidate of an ECCE aggregation level for decoding the DCI format if the SF is an ABS one 1812. Alternatively, the low cost UE includes an EPDCCH candidate of an ECCE aggregation level for decoding the DCI format 1845 if the SF is a normal one (1850, 1854) and excludes an EPDCCH candidate of an ECCE aggregation level for decoding the DCI format if the SF is an actual MBSFN one 1852.

Timing for EPDCCH Repetitions in Case of Multiple EPDCCH Repetition Numbers

The eNB 102 cannot know with sufficient accuracy a coverage enhancement level required for a low cost UE, such as UE 114, and as a power available for transmitting EPDCCH repetitions to the low cost UE can vary in time, the low cost UE can be configured by the eNB 102 to monitor EPDCCH for multiple repetition levels in order to provide flexibility to the eNB to optimize use of power and bandwidth resources and accordingly adjust a number of EPDCCH repetitions for an EPDCCH transmission to the low cost UE. Using an adaptive number of EPDCCH repetitions also requires means for enabling the eNB and the low cost UE to have a same understanding for a number of EPDCCH repetitions the eNB used to transmit an EPDCCH scheduling a PDSCH or a PUSCH because, otherwise, the low cost UE may attempt to receive PDSCH or transmit PUSCH in incorrect respective SFs.

When a low cost UE is configured to blindly decode multiple numbers of EPDCCH repetitions, such as for example 4 EPDCCH repetitions or 8 EPDCCH repetitions conveying a DCI format, timing for EPDCCH repetitions needs to be defined in order for the low cost UE to correctly accumulate EPDCCH repetitions, avoid having to simultaneously receive multiple PDSCH or transmit multiple PUSCH, and avoid a complicated timing relation between EPDCCH repetitions and PDSCH repetitions or PUSCH repetitions.

In a first alternative, timing for a PDSCH reception scheduled by a DCI format conveyed by repetitions of an EPDCCH transmission can be relative to timing for the largest number of EPDCCH repetitions. For example, using the EPDCCH transmission window concept, $W_{EPDCCH}$, a starting SF for a first repetition of EPDCCH transmission y can be in a frame with SFN=Z and SF number $n_s$, where $$n_s = (n_{s0} + y \cdot W_{EPDCCH}) \bmod D$$

$$Z = Z_0 + \lfloor (n_{s0} + y \cdot W_{EPDCCH})/D \rfloor \qquad (5).$$

If $n_{s0}=0$ and $Z_0=0$, then $n_s=y \cdot W_{EPDCCH}$ mod D and $Z=\lfloor y \cdot W_{EPDCCH}/D \rfloor$. In Equation 5, $n_{s0}$ and $Z_0$ are respective an initial SF number and an initial SFN (for example, they can be assumed to always be zero, or they can be explicitly configured, or it can be derived as a function of C-RNTI, or UE ID, such as $n_{s0}$=(C-RNTI)mod D, etc.), $W_{EPDCCH}$ is a number of DL SFs where EPDCCH can be transmitted within a window that includes $N_{EPDCCH}$ EPDCCH repetitions and a gap (if any) to the next $N_{EPDCCH}$ EPDCCH repetitions, and D is a number of DL SFs per frame where EPDCCH can be transmitted.

In an equivalent representation of Equation 5, a starting EPDCCH SF for EPDCCH transmission y can be in a frame with SFN=z and SF number $n_s$ that satisfy Equation 6:

$$((Z-Z_0) \cdot D + n_s - n_{s0}) \bmod W_{EPDCCH} \qquad (6)$$

or Equation 7:

$$((Z-Z_0) \cdot D + n_s) \bmod W_{EPDCCH} = n_{s0} \qquad (7)$$

$W_{EPDCCH}$ can be configured to a low cost UE, such as UE 114, by an eNB, such as eNB 102, for example by a higher layer signaling or can be derived, for example as $W_{EPDCCH}=N_{EPDCCH}+Gap_{EPDCCH}$. Within $W_{EPDCCH}$, one transmission with a maximum number of $N_{EPDCCH}$ EPDCCH repetitions can be included. If values for possible EPDCCH repetition numbers are in powers of 2, such as 1, 2, 4, 8, etc., multiple EPDCCH repetitions can be supported within $W_{EPDCCH}$. However, a timing of a respective scheduled PDSCH reception follows a timing defined when the maximum of $N_{EPDCCH}$ EPDCCH repetitions is used to transmit the EPDCCH conveying a respective DCI format. Moreover, in case more than one EPDCCH transmissions with a number of EPDCCH repetitions smaller than $N_{EPDCCH}$ exist within $W_{EPDCCH}$ for a same low cost UE, they are not be used to schedule more than one respective PDSCH. For example, if a low cost UE is configured to monitor $N_{EPDCCH}=4$ EPDCCH repetitions and is also configured to monitor 2 EPDCCH repetitions, $W_{EPDCCH}$ can include one EPDCCH transmission with four repetitions or two EPDCCH transmissions with two repetitions.

Figure 19:
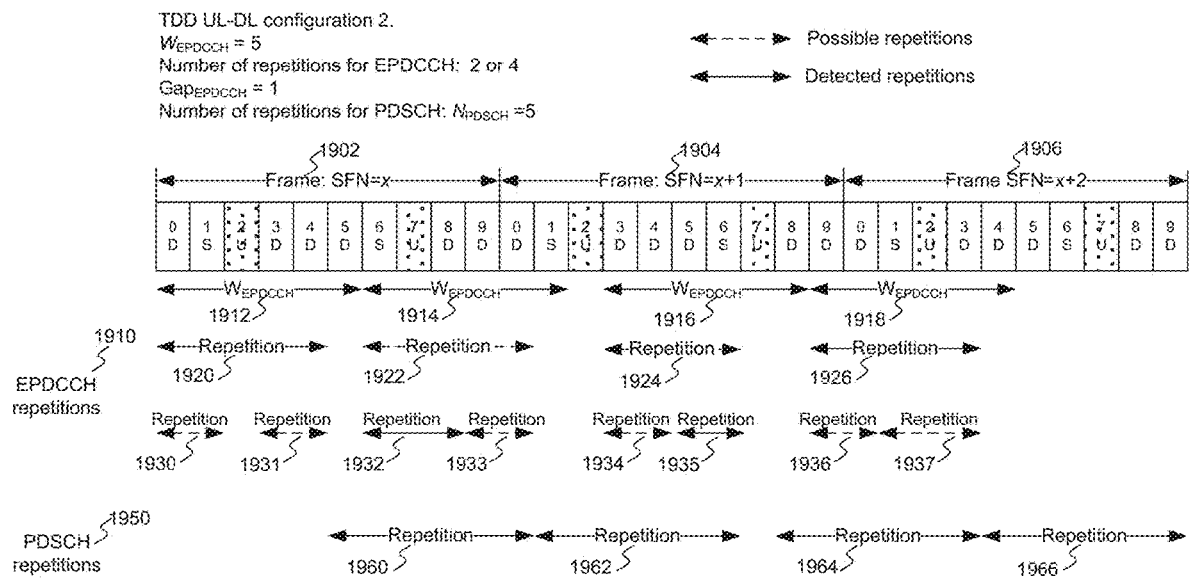
FIG. 19 illustrates example timing for EPDCCH repetitions when a low cost UE is configured with multiple numbers of EPDCCH repetitions and a single EPDCCH transmission window according to this disclosure.

FIG. 19 illustrates example timing for EPDCCH repetitions when a low cost UE is configured with multiple numbers of EPDCCH repetitions and a single EPDCCH transmission window according to this disclosure. The embodiment of timing for EPDCCH repetitions when a low cost UE is configured with multiple numbers of EPDCCH repetitions and a single EPDCCH transmission window shown in FIG. 19 is for illustration only. Other embodiments could be used without departing from the scope of the present disclosure.

In the example shown in FIG. 19, TDD UL-DL configuration 2 with D=8 is assumed. In three frames 1902, 1904, 1906, there can be four $W_{EPDCCH}$ 1912, 1914, 1916, 1918, where $W_{EPDCCH}=5$. A low cost UE is configured to monitor $N_{EPDCCH}=4$ repetitions and is also configured to monitor 2 EPDCCH repetitions 1910. For $N_{EPDCCH}=4$, possible repetitions include 1920, 1922, 1924, and 1926. For 2 EPDCCH repetitions, possible repetitions include 1930, 1931, 1932, 1933, 1934, 1935, 1936, and 1937. PDSCH repetitions 1950 are over 5 SFs and possible repetitions include 1960, 1961, 1962, 1963, 1964, 1965, and 1966. The low cost UE decodes EPDCCH repetitions 1930 and 1931 for 2 EPDCCH repetitions and 1920 for 4 EPDCCH repetitions in $W_{EPDCCH}$ 1912, detects a DL DCI format for EPDCCH repetitions 1920 and then receives PDSCH 1960. In $W_{EPDCCH}$ 1914, the low cost UE decodes EPDCCH repetitions 1932 and 1933 for 2 EPDCCH repetitions and 1922 for 4 EPDCCH repetitions, detects a DL DCI format for EPDCCH repetitions 1932, and then receives PDSCH 1962. In $W_{EPDCCH}$ 1916, the low cost UE decodes EPDCCH repetitions 1934 and 1935 for 2 EPDCCH repetitions and 1924 for 4 EPDCCH repetitions, detects a DL DCI format for EPDCCH repetitions 1935, and receives PDSCH 1964. In $W_{EPDCCH}$ 1918, the low cost UE decodes EPDCCH repetitions 1936 and 1937 for 2 EPDCCH repetitions and 1926 for 4 EPDCCH repetitions, detects a DL DCI format for EPDCCH repetitions 1926, and receives PDSCH 1966.

In a second alternative, when a low cost UE is configured to decode multiple numbers of EPDCCH repetitions, timing for EPDCCH repetitions can be according to multiple timelines where each of the multiple timelines corresponds to each of the multiple numbers of EPDCCH repetitions. For example, for two configured values of EPDCCH repetitions of 2 and 4, $N_{EPDCCH}=4$ can correspond to a first $W_{EPDCCH}$ and Equation 5, or Equation 6, or Equation 7 can be used to determine timing for EPDCCH repetitions. $N_{EPDCCH}=2$ can correspond to a second $W_{EPDCCH}$ and Equation 5, or Equation 6, or Equation 7 can again determine timing for respective EPDCCH repetitions. The first $W_{EPDCCH}$ has twice the size of the second $W_{EPDCCH}$.

Figure 20:
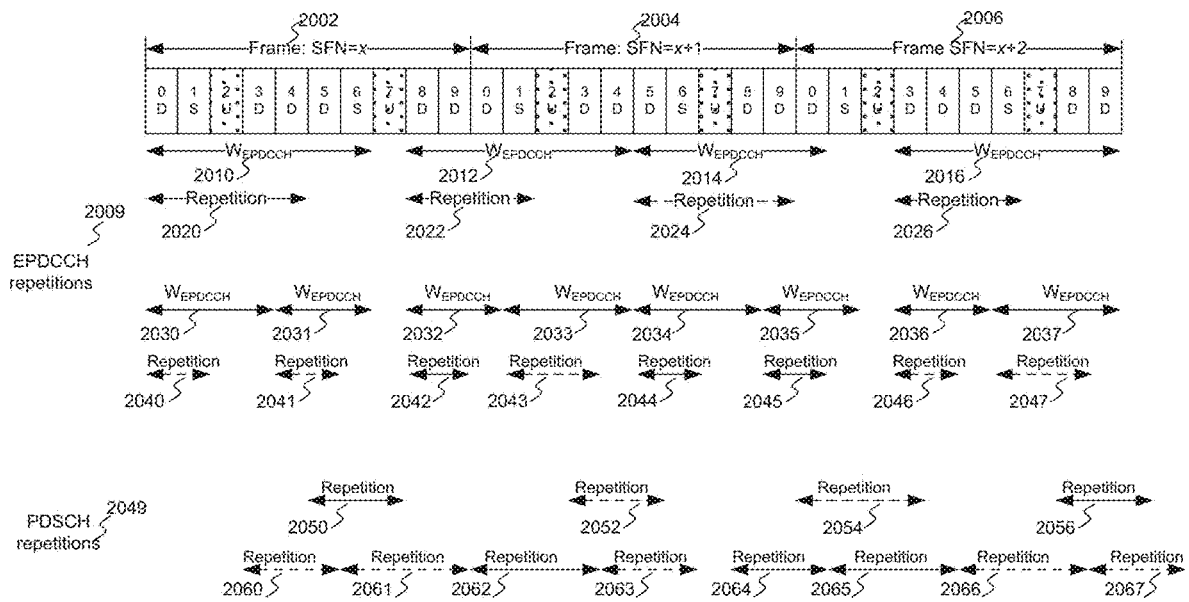
FIG. 20 illustrates example timing for EPDCCH repetitions when a low cost UE is configured with multiple numbers of EPDCCH repetitions and respective multiple EPDCCH transmission windows according to this disclosure.

FIG. 20 illustrates example timing for EPDCCH repetitions when a low cost UE is configured with multiple numbers of EPDCCH repetitions and respective multiple EPDCCH transmission windows according to this disclosure. The embodiment of timing for EPDCCH repetitions when a low cost UE is configured with multiple numbers of EPDCCH repetitions and respective multiple EPDCCH transmission windows shown in FIG. 20 is for illustration only. Other embodiments could be used without departing from the scope of the present disclosure.

In the example shown in FIG. 20, TDD UL-DL configuration 2 with D=8 is assumed. A low cost UE is configured to be configured with 2 and 4 EPDCCH repetitions 1909. For $N_{EPDCCH}=4$, in three frames 2002, 2004, and 2006, there can be four $W_{EPDCCH}$ 2010, 2012, 2014, and 2016, with $W_{EPDCCH}=6$. Possible EPDCCH repetitions include 2020, 2022, 2024, and 2026. For $N_{EPDCCH}=2$, in three frames 2002, 2004, and 2006, there can be eight $W_{EPDCCH}$ 2030, 2031, 2032, 2033, 2034, 2035, 2036, and 2037 with $W_{EPDCCH}=3$. Possible repetitions include 2040, 2041, 2042, 2043, 2044, 2045, 2046, and 2047. PDSCH repetitions 2049 are in 3 SFs and possible repetitions include 2050, 2051, 2052, 2053, 2054, 2055, and 2056 if they are scheduled by EPDCCH with $N_{EPDCCH}=4$ or 2060, 2061, 2062, 2063, 2064, 2065, 2066, and 2067 if they are scheduled by EPDCCH with $N_{EPDCCH}=2$. The low cost UE decodes EPDCCH repetitions 2020, 2040, and 2041, in $W_{EPDCCH}$ 2010, 2030, and 2031, respectively, detects a DL DCI format in EPDCCH repetitions 2020, and receives PDSCH 2050. The low cost UE decodes EPDCCH repetitions 2022, 2042, and 2043, in $W_{EPDCCH}$ 2012, 2032, and 2033, respectively, detects a DL DCI format in EPDCCH repetitions 2042, and receives PDSCH 2062. The low cost UE decodes EPDCCH repetitions 2024, 2044, and 2045, in $W_{EPDCCH}$ 2014, 2034, and 2035, respectively, detects a DL DCI format in EPDCCH repetitions 2044 and 2045 and receives PDSCH scheduled 2064 and 2065, respectively. The low cost UE decodes EPDCCH repetitions 2026, 2046, and 2047, in $W_{EPDCCH}$ 2016, 2036, and 2037, respectively, detects a DL DCI format in EPDCCH repetitions 2026, and receives PDSCH 2067.

Search Space Design for EPDCCH Repetitions Over Multiple SFs

The previous functionalities can also be viewed in terms of a new search space that is defined over multiple SFs instead of a single SF. An EPDCCH candidate of maximum size (e.g. equivalent to a PDCCH candidate including 8 CCEs or an EPDCCH candidate including 16 ECCEs in one DL SF for a conventional search space) can be defined as one corresponding to EPDCCH repetitions over $N_{EPDCCH}$ EPDCCH SFs. An EPDCCH candidate of a second maximum size (e.g. equivalent to an EPDCCH candidate including 8 ECCEs in one DL SF for a conventional search space) can be defined as one corresponding to EPDCCH repetitions over $N_{EPDCCH}/2$ DL SFs, starting at the first SF or at EPDCCH SF $N_{EPDCCH}/2+1$ (assuming that $N_{EPDCCH}$ is a power of 2), and so on.

Assuming that an EPDCCH transmission with repetitions always uses a maximum ECCE aggregation level within a SF, such as $L_{max}=16$ ECCEs, an EPDCCH candidate corresponding to each number of EPDCCH repetitions can have as a candidate in the first DL SF one of the conventional candidates defined for $L_{max}=16$ ECCEs.

In a first realization, a candidate in each of the remaining DL SFs of an EPDCCH transmission with repetitions can be either same as the candidate in the DL SF of the first EPDCCH repetition or can vary per remaining DL SF according to a predetermined pattern, or can be configured to a low cost UE, such as UE 114, from an eNB, such as eNB 102, by higher layer signaling. For example, assuming 2 candidates per DL SF for $L_{max}=16$ ECCEs and that the candidate in the first DL SF for EPDCCH repetitions is the first candidate, the candidate in each of the remaining DL SFs of a respective EPDCCH repetition can be either a respective first candidate, or can be the first or the second candidate according to the DL SF index.

In a second realization, a candidate in each DL SF can depend on a respective number of EPDCCH repetitions configured to a low cost UE, such as UE 114, from an eNB, such as eNB 102, using higher layer signaling. For example, for a total of 32 ECCEs and for $N_{EPDCCH}$ EPDCCH repetitions, the low cost UE can always use a first EPDCCH candidate with $L_{max}=16$ ECCEs in each respective DL SF while for $N_{EPDCCH}/2$ EPDCCH repetitions, the low cost UE can always use a second EPDCCH candidate with $L_{max}=16$ ECCEs in each respective DL SF. This enables transmission of an EPDCCH with $N_{EPDCCH}$ repetitions and transmission of an EPDCCH with $N_{EPDCCH}/2$ repetitions in a same DL SF while minimizing a number of decoding operations a low cost UE needs to perform in order to detect a same DCI format conveyed by EPDCCH repetitions and reducing a probability of the low cost UE detecting an EPDCCH in a number of repetitions that is different than an actual one. Therefore, when considering a first EPDCCH repetition number, a low cost UE decodes a first EPDCCH candidate in each respective DL SF while when considering a second EPDCCH repetition number, the lost UE decodes a second EPDCCH candidate in each respective DL SF.

HARQ-ACK Transmissions from UEs Using Repetitions

In response to an EPDCCH detection associated with PDSCH scheduling, a low cost UE, such as UE 114, can transmit HARQ-ACK information to an eNB, such as eNB 102. The HARQ-ACK information can be repeated according to a coverage enhancement level associated with the low cost UE. For example, HARQ-ACK signaling can be transmitted in a PUCCH over a number of SFs (repetitions) configured to the low cost UE from the eNB 102 by higher layer signaling. A PUCCH resource is defined over a SF even when a UE 114 transmits the PUCCH in different RBs in the two slots of the SF (see also REF 1 and REF 3). A PUCCH resource for a low cost UE to transmit repetitions of a PUCCH conveying the HARQ-ACK information can be configured to the low cost UE from the eNB 102 by higher layer signaling and can be same for all PUCCH repetitions. Conversely, for a non-coverage limited low cost UE, a PUCCH resource for the low cost UE to transmit an HARQ-ACK signal is not configured by higher layer signaling and the low UE can determine the PUCCH resource from an ECCE with the lowest index of a detected EPDCCH (see also REF 3). Additionally, for a conventional UE, a PUCCH resource for the UE to transmit a first repetition of a HARQ-ACK signal in a PUCCH is not configured by higher layer signaling and the conventional UE determines the PUCCH resource from an ECCE with the lowest index of a detected EPDCCH (see also REF 3) while a PUCCH resource for the UE to transmit remaining repetitions (other than the first one) of a HARQ-ACK signal in a PUCCH are configured to the UE 114 by the eNB 102 using higher layer signaling.

For coverage limited low cost UE, such as UE 114, configured with $N_{PUCCH}$ repetitions for a PUCCH transmission conveying HARQ-ACK information, a different transmission structure than a conventional one can be used in order to enhance frequency diversity over all $N_{PUCCH}$ repetitions. Unlike a conventional UE transmitting HARQ-ACK information in a PUCCH using repetitions where each repetition is in a first RB in a first slot of a SF and in a second RB (at the opposite end of a bandwidth) in a second slot of the SF (see also REF 1 and REF 3), a coverage limited low cost UE can transmit repetitions for a PUCCH transmission in a same RB for one or more SFs, such as 1, 2 or 4 SFs, before hopping to a different RB for transmitting repetitions of a PUCCH transmission in the next one or more SFs of the $N_{PUCCH}$ SFs. This can allow a receiving eNB, such as eNB 102, to obtain a channel estimate over the one or more SFs, thereby improving accuracy of the channel estimate and reception reliability for the HARQ-ACK information transmitted from the coverage limited low cost UE.

Figure 21:
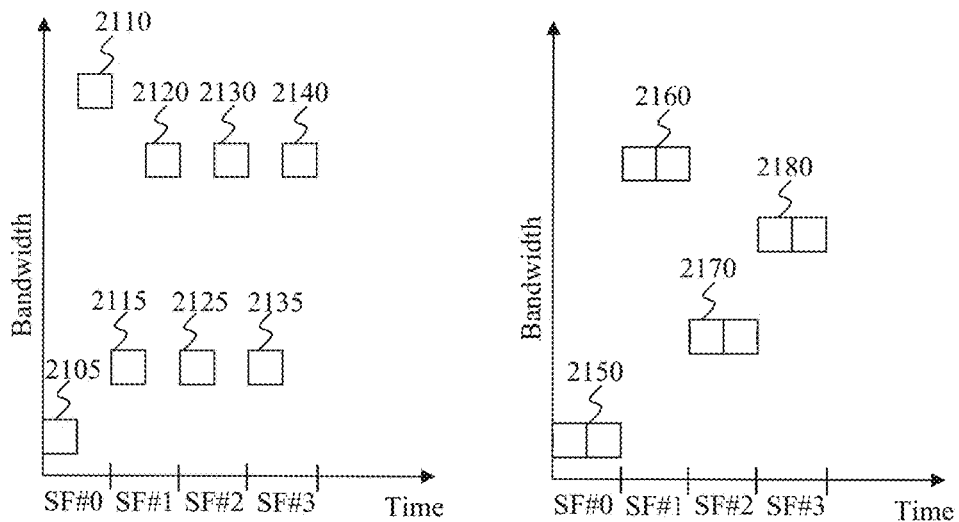
FIG. 21 illustrates an example transmission of HARQ-ACK information in a PUCCH using repetitions according to this disclosure.

FIG. 21 illustrates an example transmission of HARQ-ACK information in a PUCCH using repetitions according to this disclosure. The embodiment of transmission of HARQ-ACK information in a PUCCH using repetitions shown in FIG. 21 is for illustration only. Other embodiments could be used without departing from the scope of the present disclosure.

As shown in FIG. 21, a conventional UE, such as UE 116, is configured by higher layer signaling, such as RRC signaling, from an eNB, such as eNB 102, with four repetitions for a PUCCH transmission conveying HARQ-ACK information that is in response to a detection of a DCI format conveyed by an EPDCCH (or by a PDCCH) scheduling a PDSCH or an SPS release. The conventional UE transmits a first repetition in a PUCCH in first and second slots of a first SF in respective PUCCH resources 2105 and 2110 that are determined from an ECCE with lowest index of the EPDCCH (or from a CCE with lowest index of the PDCCH). The transmission in the second slot is in a different RB than the transmission in the first slot. The remaining three repetitions of the PUCCH transmission occur in PUCCH resources that are configured to the conventional UE by higher layer signaling from the eNB and each repetition is again in different RBs in the first and the second slot of a respective SF 2115, 2120, 2125, 2130, 2135, and 2140—see also REF 1 and REF 3. If an HARQ-ACK transmission is not in response to EPDCCH detection but is in response to a reception of a SPS PDSCH, the conventional UE uses configured resources for all repetitions of a PUCCH transmission conveying HARQ-ACK.

Although the example transmission of HARQ-ACK information in a PUCCH in FIG. 21 considers that the transmission occurs in successive SFs, a switching delay, such as 1 slot or 1 SF, can exist for a half-duplex FDD UE. This switching delay is for re-tuning a next PUCCH transmission over a number of SFs, such as 1, 2, or 4 SFs, to the frequency of a respective RB if the RB is not within a sub-band of 6 RBs of a current PUCCH transmission in the number of SFs. A coverage limited low cost UE can also transmit a PUSCH in a same manner as for a PUCCH. Therefore, a current number of PUSCH repetitions, such as 1, 2, or 4 repetitions, in respective SFs can be in a same RB and a next number of PUSCH repetitions for a same PUSCH transmission can be in a different RB that is not within a sub-band of 6 RBs that includes the RB of the current number of PUSCH repetitions. A switching delay, such as 1 slot or 1 SF, can also be included where the UE does not transmit PUSCH in order to account for operation of a half-duplex UE having a single oscillator.

For a low cost UE, such as UE 114, configured by higher layer signaling from an eNB, such as eNB 102, with four repetitions for a PUCCH transmission conveying HARQ-ACK information in response to a detection of a DCI format conveyed by an EPDCCH scheduling a PDSCH or indicating an SPS release or in response to SPS PDSCH, the eNB also configures by higher layer signaling a PUCCH resource in a respective RB. The low cost UE transmits each PUCCH repetition in a same PUCCH resource in both slots of a SF 2150, 2160, 2170, and 2180 and in PUCCH resources that can be different among SFs. The low cost UE is either configured respective PUCCH resources for each repetition from the NodeB by higher layer signaling or the low cost UE uses the same resource within a RB as for the first repetition and determines a RB for a PUCCH resource for each PUCCH repetition according to a RB hopping pattern. In the latter case, the RB hopping pattern can depend on a SF number within a frame, on a SFN, and on a total UL system bandwidth or can be confined within a set of RBs configured to the UE by the eNB, for example using broadcast signaling in a SIB or RRC signaling. If the low cost UE uses a FH pattern to determine a RB for a repetition of a PUCCH transmission, the configured PUCCH resource can be relative to a first SF in a frame with SFN equal to zero.

Figure 21A:
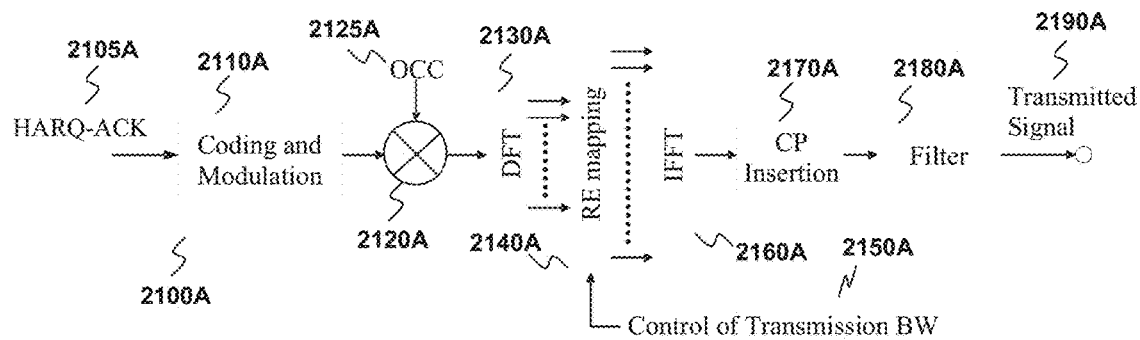
FIG. 21A illustrates an example UE transmitter diagram for HARQ-ACK information using a PUCCH according to this disclosure.

FIG. 21A illustrates an example UE transmitter diagram for HARQ-ACK information using a PUCCH according to this disclosure. The embodiment of the UE transmitter shown in FIG. 21A is for illustration only. Other embodiments could be used without departing from the scope of the present disclosure.

As shown in FIG. 21A, an HARQ-ACK information bit 2105A is encoded and modulated 2110A and then multiplied 2120A with an element of an Orthogonal Covering Code (OCC) 2125A for a respective SF symbol (see also REF 1). After DFT precoding 2130A, REs 2140A of an assigned PUCCH RB are selected 2150A, an IFFT is performed 2160A and finally a Cyclic Prefix (CP) 2170A and filtering 2180A are applied to a transmitted signal 2190A. A resulting PUCCH format is PUCCH Format 1A (see also REF 1). The assigned PUCCH RB for each slot of a SF is as in FIG. 21 according to a UE type (conventional UE or low cost UE).

Figure 21B:
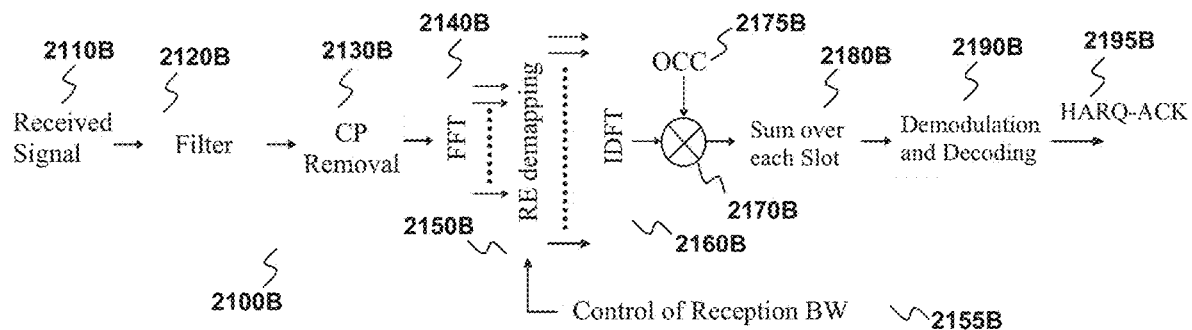
FIG. 21B illustrates an example eNB receiver diagram for HARQ-ACK information according to this disclosure.

FIG. 21B illustrates an example eNB receiver diagram for HARQ-ACK information according to this disclosure. The embodiment of the eNB receiver shown in FIG. 21B is for illustration only. Other embodiments could be used without departing from the scope of the present disclosure.

As shown in FIG. 21B, a received signal 2110B is filtered 2120B and a CP is removed 2130B. Subsequently, an eNB receiver applies a FFT 2140B, selects 2155B REs in a RB 2150B used by a UE transmitter, applies an IDFT 2160B, multiplies 2170B with an OCC element 2175B for a respective SF symbol, sums the outputs for SF symbols conveying HARQ-ACK information over each of the two SF slots 2180B, and demodulates and decodes summed HARQ-ACK signals over both SF slots 2190B to obtain an estimate of transmitted HARQ-ACK information bits 2195B. The selection of the PUCCH RB for each slot of a SF is as in FIG. 21 according to a UE type (conventional UE or low cost UE).

For TDD, a low cost UE, such as UE 114, can be configured from an eNB, such as eNB 102, by higher layer signaling whether to assume that the eNB applies a dynamic TDD UL-DL reconfiguration that a coverage limited low cost UE cannot be aware of. In such case, the eNB also configures the low cost UE by higher layer signaling a reference TDD UL-DL configuration for the low cost UE to use in determining fixed UL SFs for repetitions of a PUCCH transmission (and for repetitions of a PUSCH transmission).

A low cost UE, such as UE 114, can indicate to an eNB, such as eNB 102, a number of repetitions it required to detect an EPDCCH (or a PDSCH). This number of repetitions can be smaller than the number of repetitions configured to the low cost for detection of an EPDCCH (or PDSCH). The indication from the low cost UE to the eNB can be, for example, using MAC signaling or RRC signaling. The eNB can use the indicated information from the low cost UE for the number of repetitions the low cost UE required to detect an EPDCCH (or a PDSCH) as one of the inputs for adjusting a DL coverage enhancement level to the low cost UE (for EPDCCH or PDSCH transmissions) but also, based on such information from a number of low cost UEs, for other channels including UE-common channels conveying system information or paging.

DRX Operation for a UE Operating in Coverage Enhanced Mode

When an EPDCCH is transmitted to a low cost UE, such as UE 114, using repetitions, it can happen that a scheduled wakeup time for the low cost UE based on drxStartOffset is not at the first SF of $N_{EPDCCH}$ SFs conveying EPDCCH repetitions. In such case, the present invention considers that at a scheduled wakeup time, the low cost UE configured with DRX does not wake up and continues to be in DRX for a few more SFs where EPDCCH can be transmitted (residual EPDCCH SFs) until the beginning of a next $N_{EPDCCH}$ SFs for EPDCCH repetitions when the low cost UE can have an actual wakeup.

A low cost UE configured with DRX starts an onDurationTimer at the actual wakeup and not at a scheduled wakeup based on drxStartOffset. The onDurationTimer can have a value that is in units of $N_{EPDCCH}$ SFs or can have a value in a multiple of $N_{EPDCCH}$. Therefore, an onDurationTimer performs a counting based on a unit of $N_{EPDCCH}$ SFs and not in a unit of a single SF.

If a low cost UE configured with DRX is in onDuration and detects an EPDCCH before the end of $N_{EPDCCH}$ repetitions of an EPDCCH transmission, instead of starting an InactivityTimer at the SF of the EPDCCH detection, the low cost UE waits until the beginning of next $N_{EPDCCH}$ SFs with EPDCCH repetitions and then starts the InactivityTimer. The InactivityTimer can have a value that can be in units of $N_{EPDCCH}$ SFs or can have a value that is in units of SFs where EPDCCH can be transmitted and the value is a multiple of $N_{EPDCCH}$.

Figure 22:
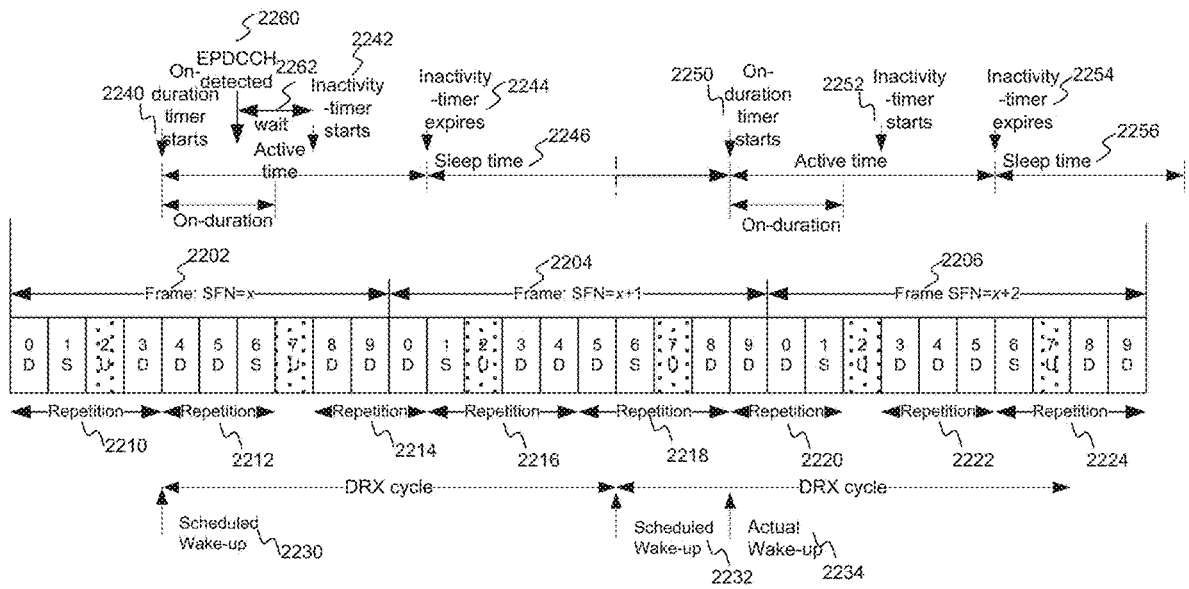
FIG. 22 illustrates an example DRX procedure for a low cost UE configured to detect an EPDCCH with $N_{EPDCCH}$ repetitions according to this disclosure.

FIG. 22 illustrates an example DRX procedure for a low cost UE configured to detect an EPDCCH with $N_{EPDCCH}$ repetitions according to this disclosure. The embodiment of a DRX procedure for a low cost UE configured to detect an EPDCCH with $N_{EPDCCH}$ repetitions shown in FIG. 22 is for illustration only. Other embodiments could be used without departing from the scope of the present disclosure.

In the example shown in FIG. 22, for TDD UL-DL configuration 2, and a low cost UE, such as UE 114, configured $N_{EPDCCH}=3$, the low cost UE wakes up based on a scheduled wakeup 2230 according to DRX cycle and a drxStartOffset to the DRX cycle. As the wakeup time is at the beginning of a triplet of EPDCCH repetition SFs 2212, the low cost UE starts an onDurationTimer 2240, detects an EPDCCH after two repetitions 2260, and waits for the next triplet of EPDCCH repetition SFs 2262. The low cost UE starts an InactivityTimer 2242 at the beginning of a triplet of EPDCCH repetition SFs 2214. An InactivityTimer value is assumed to be 3 EPDCCH SFs or one triplet of EPDCCH repetition SFs. The low cost UE continues monitoring EPDCCH but does not detect EPDCCH when the InactivityTimer expires 2244 at the end of a triplet of EPDCCH repetition SFs 2214 and the low cost UE begins its sleep time 2246. The low cost UE has a scheduled wakeup 2232, however, as the scheduled wakeup 2232 is not at a beginning of a triplet of EPDCCH repetition SFs, the low cost UE adjusts its wakeup time so that the actual wakeup time is at the beginning of a next triplet of EPDCCH repetition SFs 2220. The low cost UE wakes up at its actual wakeup time 2234 and the sleep time 2246 ends. The low cost UE starts onDurationTimer 2250, detects an EPDCCH, and starts an InactivityTimer 2252 at the beginning of an EPDCCH repetition triplet 2222. The InactivityTimer value is assumed to be 3 EPDCCH SFs or one triplet of EPDCCH repetition SFs. The low cost UE keeps monitoring EPDCCH but does not detect an EPDCCH when the InactivityTimer expires 2254 at the end of a triplet of EPDCCH repetition SFs 2222 and the low cost UE begins its sleep time 2256.

An alternative is that a low cost UE configured with DRX can wake up at the scheduled wakeup and starts an onDurationTimer. If the scheduled wakeup is not the beginning of $N_{EPDCCH}$ SFs (or at the beginning of $N_{EPDCCH}+Gap_{EPDCCH}$ SFs), the value of the onDurationTimer can be set as a total number EPDCCH SFs including residual SFs from scheduled wakeup till the next $N_{EPDCCH}$ repetitions of EPDCCH SFs, and multiples of $N_{EPDCCH}$.

For example, as in FIG. 22, a low cost UE has a scheduled wakeup 2232, however, as the scheduled wakeup 2232 is not at a beginning of a triplet of EPDCCH repetition SFs, the low cost can start onDurationTimer at wakeup 2232 and onDurationTimer has a value of 5 EPDCCH SFs.

Another alternative is that the DRX cycle can have a value which is a multiple of $N_{EPDCCH}$ EPDCCH SFs or it can have a unit of $N_{EPDCCH}$ EPDCCH SFs instead of in a unit of a single regular SF.

This embodiment can be extended to the case where there can be a gap between two successive EPDCCH transmissions each having $N_{EPDCCH}$ repetitions. For example, onDurationTimer can have a value that is in units of $N_{EPDCCH}+Gap_{EPDCCH}$ repetitions of EPDCCH SFs or can have a value that is in units of EPDCCH SFs and the value can be a multiple of $N_{EPDCCH}+Gap_{EPDCCH}$. The InactivityTimer can have a value that can be in units of $N_{EPDCCH}+Gap_{EPDCCH}$ EPDCCH SFs or can have a value that is in units of EPDCCH SFs and the value is a multiple of $N_{EPDCCH}$+ $Gap_{EPDCCH}$.

Paging Operation for a UE Operating in Coverage Enhanced Mode

For a low cost UE, such as UE 114, operating in a coverage enhancement mode, multiple SFs can be used for one paging occasion if paging is scheduled by an EPDCCH.

The number of repetitions for an EPDCCH transmission and an associated transmission of a paging message in a PDSCH can be based on a required coverage enhancement level for the low cost UE such as, for example, on a highest coverage enhancement level of a low cost UE in a group of low cost UEs. Different PDSCHs can be used to transmit respective paging messages to different groups of UEs or different groups of UEs can detect a paging message with different numbers of repetitions for a respective PDSCH transmission. The low cost UE can be configured by an eNB, such as eNB 102, a number of repetitions for detecting an EPDCCH (if used to schedule a PDSCH conveying a paging message) or a number of repetitions for a PDSCH transmission conveying a paging message, or such configuration can be omitted and be transparent to the low cost UE (a predetermined number of repetitions for an associated coverage enhancement level can be assumed by the low cost UE).

Resources for PDSCH Repetitions

In order to optimize a spectral efficiency by adjusting a number of PDSCH repetitions for a PDSCH transmission to changing channel conditions or to power availability at an eNB, such as eNB 102, a number of PDSCH repetitions can vary per PDSCH transmission.

In a first alternative, a number of PDSCH repetitions can be dynamically derived from a number of EPDCCH repetitions conveying a DCI format scheduling the PDSCH. A low cost UE can be configured with a set of multiple numbers of EPDCCH repetitions (the elements of the set are assumed to be placed in an ascending order). Then, by detecting a valid DCI format for one of the multiple numbers of EPDCCH repetitions, $\{N_{EPDCCH,1}, \ldots, N_{EPDCCH,Q}\}$, the low cost UE can determine a number of PDSCH repetitions through a relationship between a target coverage enhancement level for EPDCCH and a target coverage enhancement level for PDSCH. This relationship can be determined in a system operation or it can be configured by a serving eNB through higher layer signaling.

In a first approach, a low cost UE determines a number of PDSCH repetitions from a number of EPDCCH repetitions the low cost UE decoded to detect a DCI format scheduling the PDSCH and a relative coverage enhancement level required for EPDCCH and for PDSCH. For example, if EPDCCH requires more repetitions than PDSCH by a factor of $F_{CD} \geq 1$ and a low cost UE detects a valid DCI format scheduling a PDSCH by decoding a EPDCCH with $N_{EPDCCH,i}$ repetitions, $1 \leq i \leq Q$, then the low cost UE can determine that the PDSCH is transmitted with $\lceil F_{CD} \cdot N_{EPDCCH,i} \rceil$ repetitions. Conversely, if PDSCH requires more repetitions than EPDCCH by a factor of $F_{DC} \geq 1$ and a low cost UE detects a valid DCI format scheduling a PDSCH by decoding an EPDCCH with $N_{EPDCCH,i}$ repetitions, $1 \leq i \leq Q$, then the low cost UE can determine that the PDSCH is transmitted with $\lceil N_{EPDCCH,i} / F_{DC} \rceil$ repetitions.

In a second approach, a low cost UE is also configured a set of multiple numbers of PDSCH repetitions, $\{N_{PDSCH,1}, \ldots, N_{PDSCH,Q}\}$, that is equal in size to a respective set for EPDCCH repetitions. Then, by assuming a one-to-one correspondence between a number of EPDCCH repetitions and a number of PDSCH repetitions, the low cost UE can determine a number of PDSCH repetitions from a number of EPDCCH repetitions the low cost UE decoded to detect a DCI format scheduling the PDSCH.

In a second alternative, a low cost UE can obtain a number of PDSCH repetitions in a time domain based on information in a detected DCI format scheduling the PDSCH. A DCI format can include a PDSCH resource field, wherein a one-to-one mapping between each value of the field and a respective number of PDSCH repetitions. A mapping for a resource scaling can be predefined in a system operation or configured, for example, by higher layer signaling. For example, the PDSCH resource configuration field can be a PDSCH resource scaling field, wherein a one-to-one mapping between each value of the field and a scaling factor for a number of PDSCH repetitions, relative to a nominal number $N_{PDSCH}$ configured by higher layer signaling, can be either predefined in a system operation or configured to the low cost UE by higher layer signaling. Table 3 provides an example for a mapping among a PDSCH resource scaling field values and numbers of PDSCH repetitions.

TABLE 3

Mapping between PDSCH resource scaling field and number of PDSCH repetitions.

| PDSCH Resource Configuration Field Value | Number of PDSCH repetitions |
|---|---|
| 00 | $\lfloor N_{PDSCH}/4 \rfloor$ |
| 01 | $\lfloor N_{PDSCH}/2 \rfloor$ |
| 10 | $N_{PDSCH}$ |
| 11 | $2 \cdot N_{PDSCH}$ |

If a number of RBs for a PDSCH transmission with repetitions is not always fixed to a maximum number of RBs, a number of PDSCH repetitions can also be defined in a frequency domain by scaling a number of RBs, $N_{PDSCH\_RB}$, used for repetitions of a PDSCH transmission. A DCI format can include a PDSCH resource configuration field in a frequency domain, with a one-to-one mapping between each value of the field and a respective number of PDSCH repetitions, where the mapping can be predefined in a system operation or configured, for example, by higher layer signaling. For example, a PDSCH resource allocation field in a DCI format can scale a number of RBs in a predetermined manner, such as for example by symmetrically including additional RBs relative to the number RBs (which can be indicated, for example, by higher layer signaling). Table 4 provides an example for a mapping among PDSCH resource configuration field values and RBs for a PDSCH transmission.

TABLE 4

Mapping between PDSCH resource configuration field and number of PDSCH RBs.

| PDSCH Resource Configuration Field Value | Number of repetitions |
|---|---|
| 0 | $N_{PDSCH\_RB}$ |
| 1 | $2 \cdot N_{PDSCH\_RB}$ |

A PDSCH resource configuration field can be used to provide scaling of PDSCH transmission resources in both the time domain and the frequency domain by combining the previously described functionalities. A low cost UE can obtain a PDSCH repetition level and PDSCH resources based on information in a respective DCI format. For example, the DCI format can include a PDSCH resource configuration index where each index can be associated with resources for PDSCH repetitions and PDSCH repetition levels. Table 5 provides an example of PDSCH resource configurations. A number of PDSCH repetitions in the time domain (number of SFs) can be different even for a same level of coverage enhancement level and the frequency domain is another dimension. For example, for a same coverage enhancement, a smaller number of repetitions in the time domain can be with a larger number of resources in frequency domain, and vice versa.

TABLE 5

An example of PDSCH resource configurations

| Configuration Index | Coverage enhancement level | Number of repetitions in time | Resources (time/frequency) |
|---|---|---|---|
| 0 | 0 | N00 | A first configuration |
| 1 | (Enhance 3 dB) | N01 | A second configuration |
| 2 | 1 | N10 | A third configuration |
| 3 | (Enhance 6 dB) | N11 | A fourth configuration |
| 4 | 2 | N20 | A fifth configuration |
| 5 | (Enhance 9 dB) | N21 | A sixth configuration |
| 6 | 3 | N30 | A seventh configuration |
| 7 | (Enhance 12 dB) | N31 | An eighth configuration |

Figure 23:
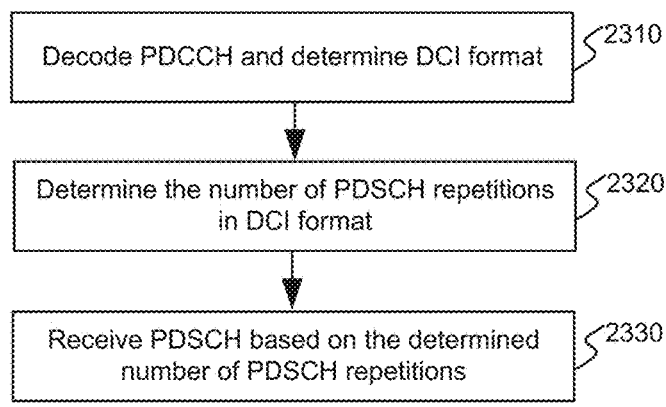
FIG. 23 illustrates example operations for a low cost UE to receive PDSCH repetitions according to this disclosure.

FIG. 23 illustrates example operations for a low cost UE to receive PDSCH repetitions according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

A low cost UE decodes EPDCCH repetitions and detects DCI format in block 2310. It determines in block 2320 a number of PDSCH repetitions indicated in the detected DCI format. It receives in block 2330 PDSCH repetitions based on the determined number.

Figure 24:
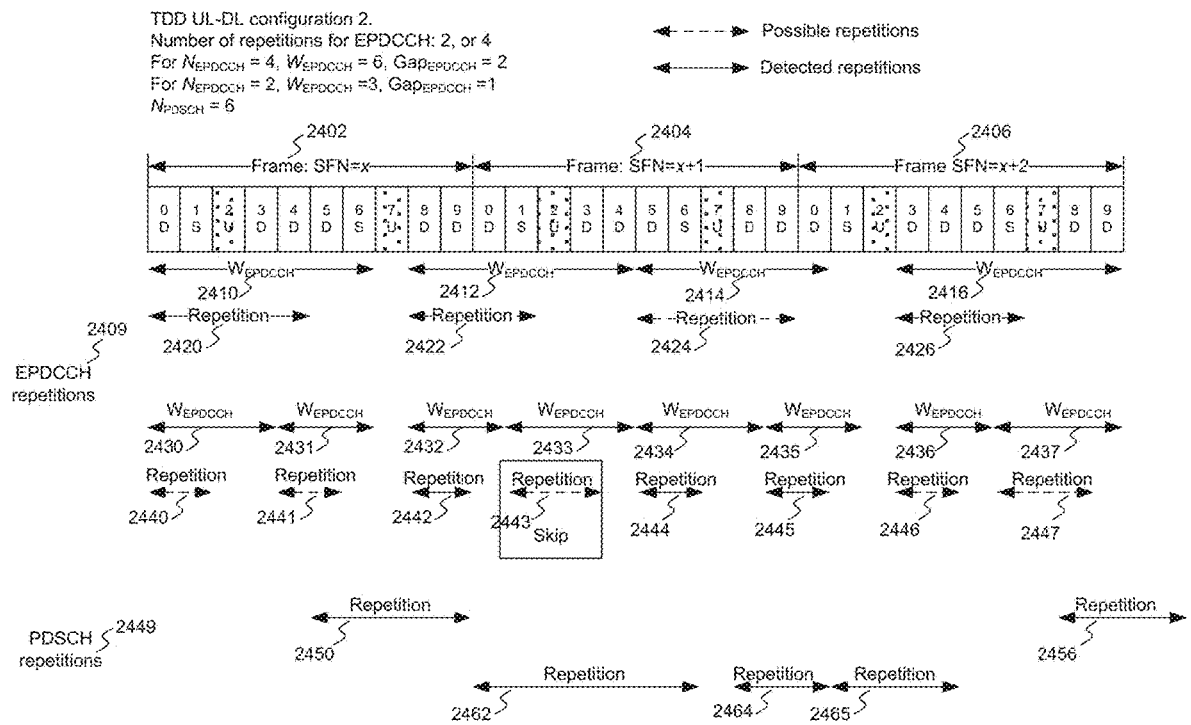
FIG. 24 illustrates example timings for EPDCCH and PDSCH, where both a number of EPDCCH repetitions and a number of PDSCH repetitions can be adaptive according to this disclosure.

FIG. 24 illustrates example timings for EPDCCH and PDSCH, where both a number of EPDCCH repetitions and a number of PDSCH repetitions can be adaptive according to this disclosure. The embodiment of timings for EPDCCH and PDSCH shown in FIG. 24 is for illustration only. Other embodiments could be used without departing from the scope of the present disclosure.

A maximum number of PDSCH repetitions is $N_{PDSCH,max}=6$. Possible EPDCCH repetitions are similar to the ones in FIG. 20. The difference with FIG. 20 is that $N_{PDSCH}$ is not fixed and it is determined based on a field in a DCI format scheduling the PDSCH. The low cost UE detects the DCI format conveyed by EPDCCH 2420 that indicates 4 repetitions for PDSCH 2450. In $W_{EPDCCH}$ 2432, the low cost UE detects the DCI format 1042 that indicates 6 repetitions for the PDSCH transmission 2462. Then, the low cost UE can skip monitoring EPDCCH 2443 as a PDSCH in addition to PDSCH 2462 cannot be scheduled. In $W_{EPDCCH}$ 2434 and 2435, the low cost UE decodes EPDCCH repetitions 2444 and 2445, each conveying a same DCI format scheduling PDSCH repetitions with 3 DL SFs 2464, 2465, respectively. In $W_{EPDCCH}$ 2416, the low cost UE decodes EPDCCH repetitions 2426, and a respective DCI format indicates PDSCH repetitions in 4 SFs 2456.

For EPDCCH repetitions scheduling a PDSCH, $W_{EPDCCH}$ can be configured to a low cost UE, such as UE 114, by higher layer signaling or, it can be set by an eNB, such as eNB 102, and derived by the low cost UE as $W_{EPDCCH}=N_{EPDCCH}+Gap_{EPDCCH}$ (for example, $Gap_{EPDCCH}=N_{PDSCH}$ or, if $N_{EPDCCH} \geq N_{PDSCH}$, $Gap_{EPDCCH}=N_{PDSCH}-N_{EDCCH}$, or $Gap_{EPDCCH}$ can be explicitly configured by higher layer signaling). $N_{PDSCH}$ can be set as the maximum number of PDSCH repetitions, if there are multiple possible numbers of PDSCH repetitions.

Resources for PUSCH Repetitions

A determination of resources for PDSCH repetitions can be applicable in a similar manner to a determination of resources for PUSCH repetitions with a difference that a first PUSCH repetition occurs after a further delay of SFs relative to a last EPDCCH repetition. The determination of resources for PDSCH repetitions, such as the number of PDSCH repetitions, resources for PDSCH repetitions, and so on, can be directly extended to the determination of resources for PUSCH repetitions. For example, a number of PUSCH repetitions can be dynamically derived from a number of EPDCCH repetitions, or a low cost UE, such as UE 114, can obtain a number of PUSCH repetitions in a time domain based on information in a detected DCI format scheduling the PUSCH, and for PUSCH repetitions, similar Tables to the ones as for the determination of resources for PDSCH repetitions can apply. Repetitions of a PUSCH transmission can always be assumed to be in 1 RB as a respective low cost UE is power limited.

EPDCCH repetitions for PUSCH scheduling can have different timing than EPDCCH repetitions for PDSCH scheduling. Repetitions of a PUSCH transmission can start at an UL SF that is no earlier than n+4+k (possibly later than n+4+k in TDD systems depending on availability of UL SFs), where n is a time index of a last SF for a number of EPDCCH repetitions. For FDD systems k=0 or, in case processing margin of k SFs is needed in addition to one provided by 4 SFs, k>0, such as, for example, k=1.

Previous equations can also be used to define timing for EPDCCH repetitions and PUSCH repetitions. A separate parameter $W_{EPDCCH}$ can apply for EPDCCH repetitions scheduling PUSCH and for EPDCCH repetitions scheduling PDSCH.

$W_{EPDCCH}$ can be configured to the low cost UE from an eNB, such as eNB 102, by higher layer signaling or, similar to PDSCH scheduling, it can be derived by the low cost UE as $W_{EPDCCH}=N_{EPDCCH}+Gap_{EPDCCH}$ where, for example, $Gap_{EPDCCH}=N_{PUSCH,DL}$ where $N_{PUSCH,DL}$ is a number of DL SFs occurring during a completion of PUSCH repetitions in $N_{PUSCH}$ UL SFs. $N_{PUSCH,DL}$ can also include SFs from the 4+k SFs that are DL SFs. In case of a half-duplex FDD low cost UE with a single oscillator, switching delays between EPDCCH reception in the DL and PUSCH transmission in the UL and between a PUSCH transmission in the UL and an EPDCCH reception in the DL. Each of the two switching delays can be, for example, equal to one SF wherein the former switching delay can be absorbed in the 4+k SFs. Then, for FDD, a half-duplex UE with a single oscillator, and for k=0, the SF for the first PUSCH repetition is n+4 SFs after the SF of the last EPDCCH repetition and, accounting for 1 UL-to-DL switching SF, $N_{PUSCH,DL}=N_{PUSCH}+4+1$. In TDD, a relationship between $N_{PUSCH,DL}$ and $N_{PUSCH}$ depends on a respective TDD UL-DL configuration (for example, $N_{PUSCH,DL}$ can be set as the maximum possible number of DL SFs, if there are multiple possible numbers of DL SFs occurring before a completion of a number of $N_{PUSCH}$ repetitions. Alternatively, if counting for $N_{EPDCCH}$ is based on DL SFs but does not exclude DL SFs where EPDCCH cannot be transmitted.

A common timeline for EPDCCH transmissions scheduling PDSCH or PUSCH, assuming a same value for $N_{EPDCCH}$ can be achieved by setting $Gap_{EPDCCH}$=max{$Gap_{EPDCCH\_DL}$, $Gap_{EPDCCH\_UL}$} where $Gap_{EPDCCH\_DL}$ is the $Gap_{EPDCCH}$ for PDSCH scheduling and where $Gap_{EPDCCH\_UL}$ is the $Gap_{EPDCCH}$ for PUSCH scheduling. This common timeline can simplify PDSCH and PUSCH scheduling by EPDCCH as a low cost UE needs to only monitor a single timeline for repetitions of an EPDCCH transmission.

Figure 25:
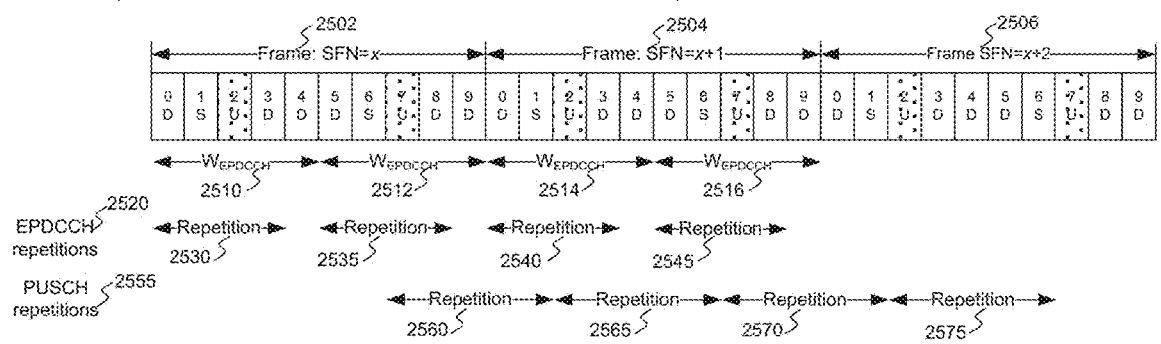
FIG. 25 illustrates example timing for EPDCCH and PUSCH repetitions for a FDD full duplex UE according to this disclosure.

FIG. 25 illustrates example timing for EPDCCH and PUSCH repetitions for a FDD full duplex UE according to this disclosure. The embodiment of timing for EPDCCH and PUSCH repetitions for a FDD full duplex UE shown in FIG. 25 is for illustration only. Other embodiments could be used without departing from the scope of the present disclosure.

In the example shown in FIG. 25, $N_{EPDCCH}$=4, $N_{PUSCH}$=5, $W_{EPDCCH}$=5. A low cost UE detects EPDCCH repetitions 2530 in $W_{EPDCCH}$ 2510. EPDCCH 2530 schedules PUSCH 2560. The low cost UE transmits PUSCH repetitions 2560. The low cost UE detects EPDCCH repetitions 2535 in $W_{EPDCCH}$ 2512. EPDCCH 2535 schedules PUSCH 2565. The low cost UE transmits PUSCH repetitions 2565. The low cost UE detects EPDCCH repetitions 2540 in $W_{EPDCCH}$ 2514. EPDCCH 2540 schedules PUSCH 2570. The low cost UE transmits PUSCH repetitions 2570. The low cost UE detects EPDCCH repetitions 2545 in $W_{EPDCCH}$ 2516. EPDCCH 2545 schedules PUSCH 2575. The low cost UE transmits PUSCH repetitions 2575.

Figure 26:
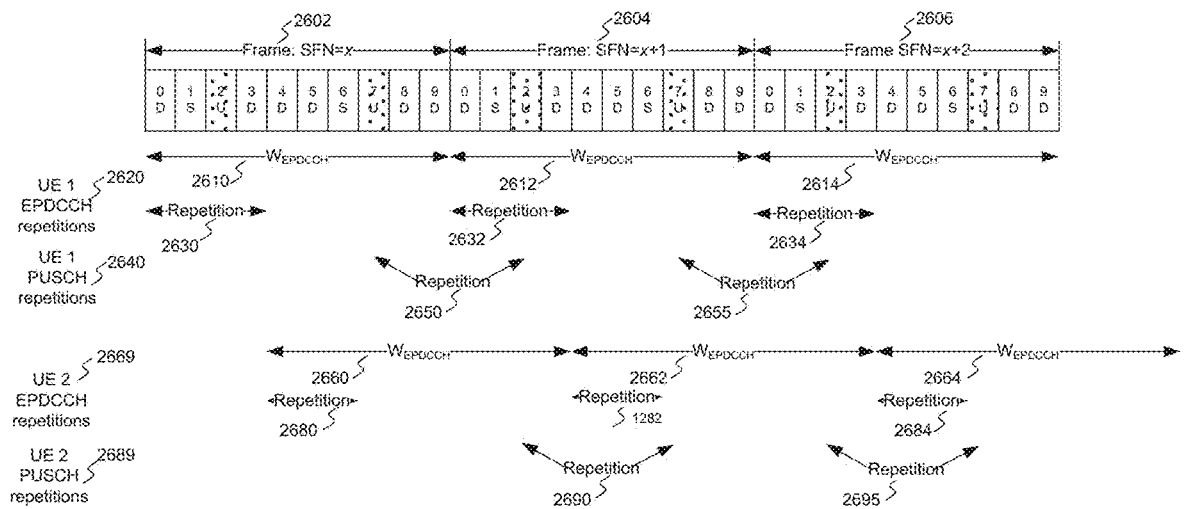
FIG. 26 illustrates example timings for EPDCCH and PUSCH repetitions for a FDD half-duplex UE or for a UE operating in TDD mode according to this disclosure.

FIG. 26 illustrates example timings for EPDCCH and PUSCH repetitions for a FDD half-duplex UE or for a UE operating in TDD mode according to this disclosure. The embodiment of timings for EPDCCH and PUSCH repetitions for a FDD half-duplex system or for a TDD system shown in FIG. 26 is for illustration only. Other embodiments could be used without departing from the scope of the present disclosure.

A low cost UE #1 detects EPDCCH repetitions 2630 scheduling a PUSCH transmission 2650 in $W_{EPDCCH}$ 2610. Low cost UE #1 transmits PUSCH repetitions 2650. Low cost UE #11 detects EPDCCH repetitions 2632 scheduling a PUSCH transmission 2655 in $W_{EPDCCH}$ 2612. Low cost UE #1 transmits PUSCH repetitions 2655. EPDCCH and PUSCH transmissions for low cost UE #22 are shifted by three DL SFs relative to respective ones for UE #1.

Monitoring One or Multiple Timelines for EPDCCH Repetitions

In general, there can be one or multiple timelines for EPDCCH repetitions for a low cost UE to monitor. For example, one timeline for EPDCCH repetitions can be for EPDCCH scheduling PDSCH and another timeline for EPDCCH repetitions can be for EPDCCH scheduling PUSCH.

Figure 27:
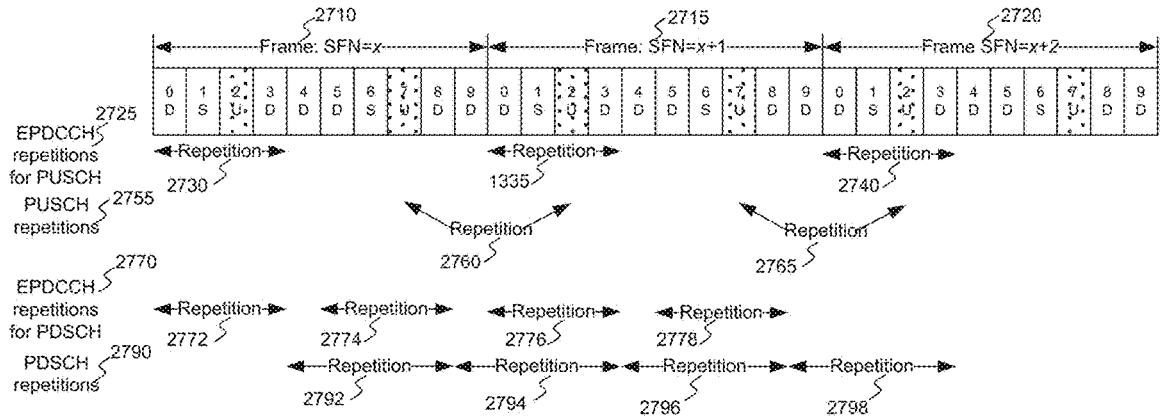
FIG. 27 illustrates two example timelines for EPDCCH repetitions, where a first timeline is for PUSCH scheduling and a second timeline is for PDSCH scheduling according to this disclosure.

FIG. 27 illustrates two example timelines for EPDCCH repetitions, where a first timeline is for PUSCH scheduling and a second timeline is for PDSCH scheduling according to this disclosure. The embodiment of two timelines for EPDCCH repetitions shown in FIG. 27 is for illustration only. Other embodiments could be used without departing from the scope of the present disclosure.

A first timeline for EPDCCH repetitions 2730, 2735 is used to schedule PUSCH 2760, 2765, respectively. A second timeline for EPDCCH repetitions 2772 through 2778 is used to schedule PDSCH 2792 through 2798, respectively. A low cost UE can monitor a union of the two timelines for EPDCCH repetitions and DL SFs can belong in the first timeline, in the second timeline, or in both the first and second timelines.

Figure 28:
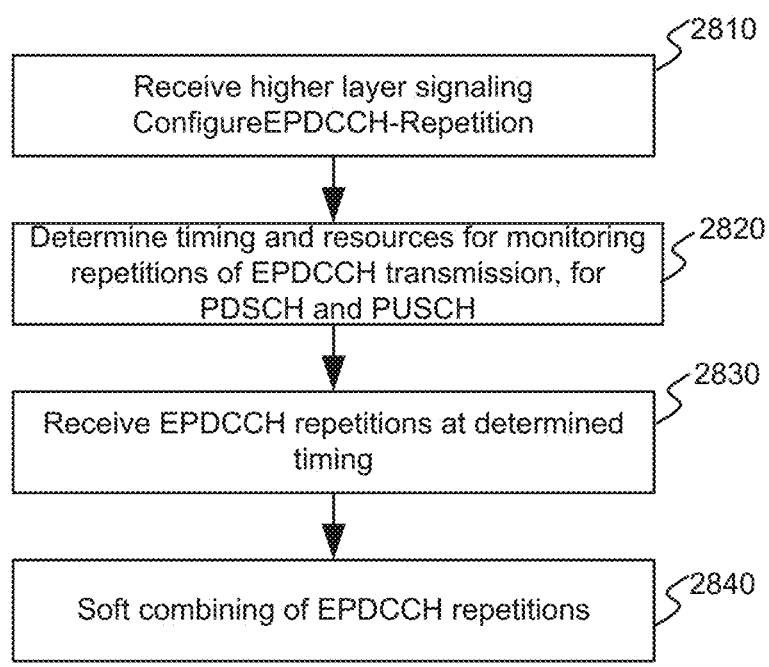
FIG. 28 illustrates example operations for a low cost UE to monitor two timelines for EPDCCH repetitions, where a first timeline is for PUSCH scheduling and a second timeline is for PDSCH scheduling according to this disclosure.

FIG. 28 illustrates example operations for a low cost UE to monitor two timelines for EPDCCH repetitions, where a first timeline is for PUSCH scheduling and a second timeline is for PDSCH scheduling according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

A low cost UE is configured by higher layer signaling an information element ConfigurePDCCH-repetition in block 2810 that determines timing and resources for monitoring transmissions of EPDCCH scheduling PDSCH or PUSCH in block 2820. The low cost UE receives the EPDCCH repetitions in respective DL SFs in block 2830 and combines EPDCCH repetitions conveying a DCI format scheduling a PDSCH or a PUSCH in block 2840.

Although the present disclosure has been described with example embodiments, various changes and modifications may be suggested to one skilled in the art. It is intended that the present disclosure encompass such changes and modifications that fall within the scope of the appended claims.

What is claimed is:

1. A method, comprising:
   receiving a configuration for an offset of $n_{s0}$ sub-frames;
   receiving a configuration for a periodicity of P sub-frames;
   determining sub-frames for receiving physical downlink control channels (PDCCHs); and
   receiving the PDCCHs in a sub-frame with a number $n_s$ satisfying $(Z \cdot N_{subframe}^{frame}+n_s-n_{s0})$ mod P=0,
   wherein $N_{subframe}^{frame}$ is a number of sub-frames per frame and Z is a frame number.

2. The method of claim 1, further comprising:
   receiving a configuration for a duration of T sub-frames, wherein T is smaller than or equal to P; and
   wherein determining the sub-frames for receiving the PDCCHs comprises determining a first consecutive number of the T sub-frames of the P sub-frames for receiving the PDCCHs.

3. The method of claim 1, further comprising receiving a configuration for a downlink control information (DCI) format provided by the PDCCHs.

4. The method of claim 1, further comprising:
   receiving a configuration for an offset of a physical downlink shared channel (PDSCH) reception sub-frame relative to a PDCCH reception sub-frame;
   receiving a downlink control information (DCI) format in a PDCCH from the PDCCHs that schedules reception of a PDSCH;
   determining a sub-frame for reception of the PDSCH by adding the offset of the PDSCH reception sub-frame to the PDCCH reception sub-frame; and
   receiving the PDSCH in the determined sub-frame.

5. The method of claim 1, further comprising:
   receiving a configuration for a bit-map corresponding to a number of sub-frames; and determining a sub-frame from the number of sub-frames for receiving the PDCCHs when a corresponding value for the bit-map equals one.

6. The method of claim 1, further comprising:
receiving a configuration for a first set of resource blocks (RBs) and for a second set of RBs; and
determining the first set of RBs in a first sub-frame and the second set of RBs in a second sub-frame for receiving the PDCCHs.

7. The method of claim 1, further comprising:
receiving a configuration for a number of PDCCH candidates per control channel element (CCE) aggregation level from a predetermined number of CCE aggregation levels, wherein a PDCCH is received over a CCE aggregation level; and
determining CCEs for receiving the PDCCHs according to the number of PDCCH candidates per CCE aggregation level.

8. A user equipment (UE), comprising:
a receiver configured to:
receive a configuration for an offset of $n_{s0}$ sub-frames; and
receive a configuration for a periodicity of P sub-frames; and
a controller configured to determine sub-frames for receiving physical downlink control channels (PDCCHs),
wherein the receiver is further configured to receive the PDCCHs in a sub-frame with a number $n_s$ satisfying $(Z \cdot N_{subframe}^{frame} + n_{s0} - n_{s0})$ mod P=0, and
wherein $N_{subframe}^{frame}$ is a number of sub-frames per frame and Z is a frame number.

9. The UE of claim 8, wherein:
the receiver is further configured to receive a configuration for a duration of T sub-frames, wherein T is smaller than or equal to P; and
the controller is further configured to instruct the receiver to receive the PDCCHs in a first consecutive number of the T sub-frames of the P sub-frames for receiving the PDCCHs.

10. The UE of claim 8, wherein the receiver is further configured to receive a configuration for a downlink control information (DCI) format provided by the PDCCHs.

11. The UE of claim 8, wherein:
the receiver is further configured to:
receive a configuration for an offset of a physical downlink shared channel (PDSCH) reception sub-frame relative to a PDCCH reception sub-frame; and
receive a downlink control information (DCI) format in a PDCCH from the PDCCHs that schedules reception of a PDSCH,
the controller is further configured to determine a sub-frame for the receiver to receive the PDSCH by adding the offset of the PDSCH reception sub-frame to the PDCCH reception sub-frame, and
the receiver is further configured to receive the PDSCH in the determined sub-frame.

12. The UE of claim 8, wherein:
the receiver is further configured to receive a configuration for a bit-map corresponding to a number of sub-frames, and
the controller is further configured to instruct the receiver to receive the PDCCHs in a sub-frame from the number of sub-frames when a corresponding value for the bit-map equals one.

13. The UE of claim 8, wherein:
the receiver is further configured to receive a configuration for a first set of resource blocks (RBs) and for a second set of RBs, and
the controller is further configured to instruct the receiver to receive PDCCHs in the first set of RBs in a first sub-frame and in the second set of RBs in a second sub-frame.

14. The UE of claim 8, wherein:
the receiver is further configured to receive a configuration for a number of PDCCH candidates per control channel element (CCE) aggregation level from a predetermined number of CCE aggregation levels, wherein a PDCCH is received over a CCE aggregation level; and
the controller is further configured to instruct the receiver to receive the PDCCHs in CCEs determined according to the number of PDCCH candidates per CCE aggregation level.

15. A base station, comprising:
a transmitter configured to:
transmit a configuration for an offset of $n_{s0}$ sub-frames; and
transmit a configuration for a periodicity of P sub-frames; and
a controller configured to determine sub-frames for transmission of physical downlink control channels (PDCCHs),
wherein the transmitter is configured to transmit the PDCCHs in a sub-frame with a number $n_s$ satisfying $(Z \cdot N_{subframe}^{frame} + n_s, n_{s0})$ mod P=0, and
wherein $N_{subframe}^{frame}$ is a number of sub-frames per frame and Z is a frame number.

16. The base station of claim 15, wherein:
the transmitter is further configured to transmit a configuration for a duration of T sub-frames, wherein T is smaller than or equal to P; and
the controller is further configured to instruct the transmitter to transmit the PDCCHs in a first consecutive number of the T sub-frames of the P sub-frames for receiving the PDCCHs.

17. The base station of claim 15, wherein the transmitter is further configured to transmit a configuration for a downlink control information (DCI) format provided by the PDCCHs.

18. The base station of claim 15, wherein:
the transmitter is further configured to:
transmit a configuration for an offset of a physical downlink shared channel (PDSCH) transmission sub-frame relative to a PDCCH transmission sub-frame; and
transmit a downlink control information (DCI) format in a PDCCH from the PDCCHs that schedules transmission of a PDSCH,
the controller is further configured to determine a sub-frame for the transmitter to transmit the PDSCH by adding the offset of the PDSCH transmission sub-frame to the PDCCH transmission sub-frame, and
the transmitter is further configured to transmit the PDSCH in the determined sub-frame.

19. The base station of claim 15, wherein:
the transmitter is further configured to transmit a configuration for a bit-map corresponding to a number of sub-frames, and the controller is further configured to instruct the transmitter to transmit the PDCCHs in a sub-frame from the number of sub-frames when a corresponding value for the bit-map equals one.

20. The base station of claim 15, wherein:

the transmitter is further configured to transmit a configuration for a first set of resource blocks (RBs) and for a second set of RBs, and the controller is further configured to instruct the transmitter to transmit PDCCHs in the first set of RBs in a first sub-frame and in the second set of RBs in a second sub-frame.

* * * * *